United States Patent
Stobbe et al.

(10) Patent No.: US 10,994,728 B2
(45) Date of Patent: *May 4, 2021

(54) CHARACTERIZING A VEHICLE COLLISION

(71) Applicant: Geotab Inc., Oakville (CA)

(72) Inventors: Paul Stobbe, Munich (DE); Stefania Talpa, Madrid (ES); Daniel Jacob Lewis, Burlington (CA); Jorge González Núñez, Madrid (ES); Ivan Lequerica Roca, Madrid (ES); Luis Alfonso Hernández Gómez, Madrid (ES)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,916

(22) Filed: Oct. 19, 2020

(65) Prior Publication Data

US 2021/0031761 A1    Feb. 4, 2021

Related U.S. Application Data

(63) Continuation of application No. 16/928,314, filed on Jul. 14, 2020, now Pat. No. 10,843,691, which is a
(Continued)

(30) Foreign Application Priority Data

Jun. 29, 2018    (ES) .............................. ES201830655

(51) Int. Cl.
*B60W 30/09*    (2012.01)
*B60R 21/0132*    (2006.01)
(Continued)

(52) U.S. Cl.
CPC ......... *B60W 30/09* (2013.01); *B60R 21/0132* (2013.01); *B60R 21/0134* (2013.01); *B60W 30/0953* (2013.01)

(58) Field of Classification Search
CPC .............. B60W 30/09; B60W 30/0953; B60R 21/0132; B60R 21/0134
(Continued)

(56) References Cited

U.S. PATENT DOCUMENTS 3,146,624 A    9/1964  Talbot
5,491,631 A    2/1996  Shirane et al.
(Continued)

FOREIGN PATENT DOCUMENTS

CN    104062465 A   *  9/2014
CN    104460464 A   *  3/2015
(Continued)

OTHER PUBLICATIONS

Mohammad et al., "MEMS Accelerometer Based Low-Cost Collision Impact Analyzer," 2016, Publisher: IEEE.*
(Continued)

*Primary Examiner* — Tuan C To
(74) *Attorney, Agent, or Firm* — Wolf, Greenfield & Sacks, P.C.

(57) ABSTRACT

Described herein are examples of a system that processes information describing movement of a vehicle at a time related to a potential collision to reliably determine whether a collision occurred and/or one or more characteristics of the collision. In response to obtaining information regarding a potential collision, data describing movement of the vehicle before and/or after a time associated with the potential collision is analyzed to determine whether the collision occurred and/or to determine one or more collision characteristic(s). The analysis may be carried out at least in part using a trained classifier that classifies the vehicle movement data into one or more classes, where at least some the classes are associated with whether a collision occurred and/or one or more characteristics of a collision. If a collision is
(Continued)

determined to be likely, one or more actions may be triggered based on the characteristic(s) of the collision.

29 Claims, 14 Drawing Sheets

Related U.S. Application Data continuation of application No. 16/456,077, filed on Jun. 28, 2019.

(51) Int. Cl.
  *B60W 30/095* (2012.01)
  *B60R 21/0134* (2006.01)
(58) Field of Classification Search
  USPC .......................................................... 701/301
  See application file for complete search history.

(56) References Cited

U.S. PATENT DOCUMENTS

| | | | |
|---|---|---|---|
| 5,801,619 A | 9/1998 | Liu et al. | |
| 6,076,028 A | 6/2000 | Donnelly et al. | |
| 6,185,410 B1 | 2/2001 | Greene | |
| 7,089,099 B2 | 8/2006 | Shostak et al. | |
| 7,123,164 B2 | 10/2006 | Zoladek et al. | |
| 7,158,016 B2 | 1/2007 | Cuddihy et al. | |
| 7,421,322 B1 | 9/2008 | Silversmith et al. | |
| 7,656,280 B2 | 2/2010 | Hines et al. | |
| 7,725,216 B2 | 5/2010 | Kim | |
| 7,853,375 B2 | 12/2010 | Tuff | |
| 8,032,276 B2 | 10/2011 | Cawse | |
| 8,437,903 B2 | 5/2013 | Willard | |
| 8,589,015 B2 | 11/2013 | Willis et al. | |
| 8,768,560 B2 | 7/2014 | Willis | |
| 8,825,271 B2 | 9/2014 | Chen | |
| 9,043,041 B2 | 5/2015 | Willis et al. | |
| 9,373,149 B2 | 6/2016 | Abhyanker | |
| 9,607,444 B2 | 3/2017 | Cawse | |
| 9,650,007 B1* | 5/2017 | Snyder ................. | B60R 21/0132 |
| 10,072,933 B1* | 9/2018 | Surpi ..................... | G07C 5/085 |
| 10,083,551 B1* | 9/2018 | Schmitt ................. | G07C 5/085 |
| 10,246,037 B1 | 4/2019 | Shea et al. | |
| 10,395,438 B2 | 8/2019 | Jenkins et al. | |
| 10,460,534 B1 | 10/2019 | Brandmaier et al. | |
| 10,676,084 B2 | 6/2020 | Fujii | |
| 10,688,927 B2* | 6/2020 | Lee ....................... | G01S 15/931 |
| 10,843,691 B2 | 11/2020 | Stobbe et al. | |
| 2003/0154017 A1 | 8/2003 | Ellis | |
| 2003/0158638 A1 | 8/2003 | Yakes et al. | |
| 2003/0191568 A1 | 10/2003 | Breed | |
| 2004/0036261 A1 | 2/2004 | Breed | |
| 2005/0040937 A1 | 2/2005 | Cuddihy et al. | |
| 2007/0088465 A1 | 4/2007 | Heffington | |
| 2008/0161989 A1 | 7/2008 | Breed | |
| 2009/0048750 A1 | 2/2009 | Breed | |
| 2009/0051510 A1 | 2/2009 | Follmer et al. | |
| 2009/0055044 A1 | 2/2009 | Dienst | |
| 2009/0228157 A1 | 9/2009 | Breed | |
| 2009/0237226 A1 | 9/2009 | Okita | |
| 2009/0256690 A1 | 10/2009 | Golenski | |
| 2009/0276115 A1 | 11/2009 | Chen | |
| 2010/0052945 A1 | 3/2010 | Breed | |
| 2010/0065344 A1 | 3/2010 | Collings, III | |
| 2010/0141435 A1 | 6/2010 | Breed | |
| 2010/0207754 A1 | 8/2010 | Shostak et al. | |
| 2010/0228432 A1 | 9/2010 | Smith et al. | |
| 2010/0256863 A1 | 10/2010 | Nielsen et al. | |
| 2010/0268423 A1 | 10/2010 | Breed | |
| 2011/0093162 A1 | 4/2011 | Nielsen et al. | |
| 2011/0130915 A1 | 6/2011 | Wright et al. | |
| 2011/0202305 A1 | 8/2011 | Willis et al. | |
| 2012/0022780 A1 | 1/2012 | Kulik et al. | |
| 2012/0071151 A1 | 3/2012 | Abramson et al. | |
| 2012/0089299 A1 | 4/2012 | Breed | |
| 2012/0095674 A1 | 4/2012 | Lee et al. | |
| 2012/0129544 A1 | 5/2012 | Hodis et al. | |
| 2012/0224827 A1 | 9/2012 | Tano | |
| 2013/0218603 A1 | 8/2013 | Hagelstein et al. | |
| 2013/0274955 A1 | 10/2013 | Rosenbaum | |
| 2013/0302758 A1 | 11/2013 | Wright | |
| 2013/0325250 A1 | 12/2013 | Cawse | |
| 2013/0331055 A1 | 12/2013 | McKown et al. | |
| 2014/0253308 A1 | 9/2014 | Kanda | |
| 2014/0288727 A1* | 9/2014 | Everhart .................. | B60T 7/22 |
| | | | 701/1 |
| 2015/0142209 A1 | 5/2015 | Breed | |
| 2015/0206357 A1 | 7/2015 | Chen et al. | |
| 2015/0206358 A1 | 7/2015 | Chen et al. | |
| 2016/0117868 A1 | 4/2016 | Mitchell et al. | |
| 2017/0053461 A1 | 2/2017 | Pal et al. | |
| 2017/0101093 A1 | 4/2017 | Barfield, Jr. et al. | |
| 2017/0132856 A1 | 5/2017 | Cawse | |
| 2017/0147420 A1 | 5/2017 | Cawse et al. | |
| 2017/0149601 A1 | 5/2017 | Cawse et al. | |
| 2017/0149602 A1 | 5/2017 | Cawse et al. | |
| 2017/0150442 A1 | 5/2017 | Cawse et al. | |
| 2017/0201619 A1 | 7/2017 | Cohen et al. | |
| 2017/0210323 A1 | 7/2017 | Cordova et al. | |
| 2017/0263120 A1 | 9/2017 | Durie, Jr. et al. | |
| 2017/0309092 A1 | 10/2017 | Rosenbaum | |
| 2018/0025235 A1 | 1/2018 | Fridman | |
| 2018/0108189 A1 | 4/2018 | Park et al. | |
| 2018/0188032 A1 | 7/2018 | Ramanandan et al. | |
| 2018/0188384 A1 | 7/2018 | Ramanandan et al. | |
| 2018/0218549 A1 | 8/2018 | Wahba et al. | |
| 2019/0122551 A1 | 4/2019 | Madrigal et al. | |
| 2019/0139327 A1* | 5/2019 | Hay, II .................. | B60Q 1/444 |
| 2019/0279440 A1 | 9/2019 | Ricci | |
| 2019/0334763 A1 | 10/2019 | Cawse et al. | |
| 2019/0378355 A1 | 12/2019 | Bruneel, II et al. | |
| 2020/0001865 A1 | 1/2020 | Stobbe et al. | |
| 2020/0209873 A1 | 7/2020 | Chen | |
| 2020/0294401 A1 | 9/2020 | Kerecsen | |
| 2020/0380799 A1 | 12/2020 | Cawse | |

FOREIGN PATENT DOCUMENTS

| | | | | |
|---|---|---|---|---|
| CN | 109049006 A | * | 12/2018 | ............ B25J 9/0003 |
| DE | 102007007848 A1 | * | 6/2008 | ............ B60Q 1/448 |
| EP | 1569176 A2 | | 8/2005 | |
| GB | 2485971 A | | 6/2012 | |
| JP | 2008-073267 A | | 4/2008 | |
| WO | WO 2000/019239 A2 | | 4/2000 | |
| WO | WO 2000/052443 A1 | | 9/2000 | |
| WO | WO 2004/106883 A1 | | 12/2004 | |
| WO | WO 2013/105869 A1 | | 7/2013 | |
| WO | WO 2013/184620 A1 | | 12/2013 | |
| WO | WO-2014177891 A1 | * | 11/2014 | ......... B60R 21/0132 |

OTHER PUBLICATIONS

Tey et al., "Mobile Vehicle Crash Detection System," 2018, Publisher: IEEE.*

Extended European Search Report for European Application No. 19181267.6 dated Nov. 21, 2019.

Extended European Search Report for European Application No. 19193207.8 dated Nov. 12, 2019.

Spanish Search Report for Spanish Application No. P201830655 dated Mar. 25, 2019.

[No Author Listed], 2017 road safety statistics: What is behind the figures? European Commission—Fact Sheet. Apr. 10, 2018;5 pages. http://europa.eu/rapid/press-release_MEMO-18-2762_en.pdf. [last accessed Dec. 5, 2019].

[No Author Listed], Ecall in all new cars from Apr. 2018. European Commission, Digital Single Market. Apr. 28, 2015:3 pages. https://ec.europa.eu/digital-single-market/en/news/ecall-all-new-cars-april-2018. [last accessed Dec. 5, 2019].

[No Author Listed], Statistics—accidents data. European Commission Community database on Accidents on the Roads in Europe

(56) References Cited

OTHER PUBLICATIONS (CARE) Report. Dec. 9, 2020:1 page. https://ec.europa.eu/transport/road_safety/specialist/statistics_en [last accessed Dec. 9, 2020].

[No Author Listed], The interoperable eu-wide ecall. European Commission, Mobility and Transport. May 12, 2019:6 pages. https://ec.europa.eu/transport/themes/its/road/action_plan/ecall_en. [last accessed Dec. 5, 2019].

[No Author Listed], Traffic Safety Basic Facts 2017. European Commission, European Road Safety Observatory. 2017:21 pages. https://ec.europa.eu/transport/road_safety/sites/roadsafety/files/pdf/statistics/dacota/bfs2017_main_figures.pdf. [last accessed Dec. 5, 2019].

Ahmed, Accident Reconstruction with Telematics Data: Quick Guide for Fleet Managers. Geotab. Oct. 20, 2016:1-17.

Aloul et al., ibump: Smartphone application to detect car accidents. Industrial Automation, Information and Communications Technology (IAICT), 2014 International Conference on, IEEE. 2014:52-56.

Altun et al., Human activity recognition using inertial/magnetic sensor units. International workshop on human behavior understanding. Springer, Berlin, Heidelberg. Aug. 22, 2010:38-51.

Apté et al., Data mining with decision trees and decision rules. Future generation computer systems. Nov. 1, 1997;13(2-3):197-210.

Baoli et al., An improved k-nearest neighbor algorithm for text categorization. arXiv preprint cs/0306099. Jun. 16, 2003: 7 pages.

Bayat et al., A study on human activity recognition using accelerometer data from smartphones. Procedia Computer Science. Jan. 1, 2014;34:450-7.

Bebis et al., Feed-forward neural networks. IEEE Potentials. Oct. 1994;13(4):27-31.

Bottou, Large-scale machine learning with stochastic gradient descent. Proceedings of COMPSTAT'2010. Springer. 2010:177-186.

Breiman, Random forests. Machine learning. Oct. 1, 2001;45(1):5-32.

Broomé, Objectively recognizing human activity in body-worn sensor data with (more or less) deep neural networks. KTH Royal Institute of Technology School of Computer Science and Communication. 2017:64 pages.

Brown et al., Are you ready for the era of 'big data'. McKinsey Quarterly. Oct. 2011;4(1):1-12.

Buscarino et al., Driving assistance using smartdevices. 2014 IEEE International Symposium on Intelligent Control (ISIC) Oct. 8, 2014:838-842.

Chong et al., Traffic accident analysis using machine learning paradigms. Informatica. Jan. 1, 2005;29(1):89-98.

Christ, Convolutional Neural Networks for Classification and Segmentation of Medical Images. Ph.D. thesis, Technische Universität München. 2017:137 pages.

Dimitrakopoulos et al., Intelligent transportation systems. IEEE Vehicular Technology Magazine. Mar. 15, 2010;5(1):77-84.

Errejon et al., Use of artificial neural networks in prostate cancer. Molecular urology. Dec. 1, 2001;5(4):153-8.

Frigge et al., Some implementations of the boxplot. The American Statistician. Feb. 1, 1989;43(1):50-4.

Gentleman et al., Unsupervised machine learning. Bioconductor case studies. Springer, New York, NY. 2008:137-157.

Glorot et al., Understanding the difficulty of training deep feedforward neural networks. Proceedings of the thirteenth international conference on artificial intelligence and statistics Mar. 31, 2010:249-256.

Goetz et al., Extremely randomized trees based brain tumor segmentation. Proceeding of BRATS challenge-MICCAI. May 2014:7 pages.

Gu et al., Recent advances in convolutional neural networks. Pattern Recognition. 2017:38 pages.

Harms, Terrestrial gravity fluctuations. Living reviews in relativity. Dec. 1, 2015;18(1):1-150.

Hecht-Nielsen, Theory of the backpropagation neural network. Neural networks for perception. Academic Press, Inc. 1992:65-93.

Hinton et al., Deep neural networks for acoustic modeling in speech recognition: The shared views of four research groups. IEEE Signal Processing Magazine. Nov. 2012;29(6):82-97.

Iandola et al., SqueezeNet: AlexNet-level accuracy with 50x fewer parameters and< 0.5 MB model size. arXiv preprint arXiv:1602.07360. Feb. 24, 2016:1-13.

Ioffe et al., Batch normalization: Accelerating deep network training by reducing internal covariate shift. arXiv preprint arXiv:1502.03167. Feb. 11, 2015:1-11.

Jain et al., Data clustering: 50 years beyond K-means. Pattern recognition letters. Jun. 1, 2010;31(8):651-66.

Jolliffe, Principal component analysis and factor analysis. Principal component analysis. Springer, 1986:111-149.

Júnior et al., Driver behavior profiling: An investigation with different smartphone sensors and machine learning. PLoS one. Apr. 10, 2017;12(4):1-16.

Keller et al., A fuzzy k-nearest neighbor algorithm. IEEE transactions on systems, man, and cybernetics. Jul. 1985(4):580-5.

Keogh et al., Exact indexing of dynamic time warping. Knowledge and information systems. Mar. 1, 2005;7(3):29 pages.

Khorrami et al., Do deep neural networks learn facial action units when doing expression recognition?. Proceedings of the IEEE International Conference on Computer Vision Workshops 2015:19-27.

Kitchin, The data revolution: Big data, open data, data infrastructures and their consequences. Sage; Aug. 18, 2014:244 pages.

Krizhevsky et al., Imagenet classification with deep convolutional neural networks. Communications of the ACM. Jun. 2017;60(6):84-90.

Larose, k-nearest neighbor algorithm. Discovering knowledge in data: An introduction to data mining. 2005:90-106.

Lecun et al., Backpropagation applied to handwritten zip code recognition. Neural Computation. Dec. 1989;1(4):541-51.

Li et al., An improved k-nearest neighbor algorithm for text categorization. arXiv preprint cs/0306099. Jun. 16, 2003:7 pages.

Liaw et al., Classification and regression by randomForest. R news. Dec. 3, 2002;2(3):1-41.

McCulloch et al., A logical calculus of the ideas immanent in nervous activity. The Bulletin of Mathematical Biophysics. Dec. 1, 1943;5(4):115-33.

Michalski et al., Machine learning: An artificial intelligence approach. Springer Science & Business Media. 2013. 587 pages.

Naik, Advances in Principal Component Analysis: Research and Development. Springer, 2017:256 pages.

Nair et al., Rectified linear units improve restricted boltzmann machines. Proceedings of the 27th international conference on machine learning (ICML-10). Jan. 1, 2010:8 pages.

Neter et al., Applied linear statistical models. Chicago: Irwin; Feb. 1996 Fourth Edition. 1432 pages.

Olah et al., The building blocks of interpretability. Distill. Mar. 6, 2018;3(3):1-22.

Perez et al., The effectiveness of data augmentation in image classification using deep learning. arXiv preprint arXiv:1712.04621. Dec. 13, 2017:8 pages.

Qian et al., Similarity between Euclidean and cosine angle distance for nearest neighbor queries. Proceedings of the 2004 ACM Symposium on Applied Computing, ACM. Mar. 14, 2004:1232-1237.

Robert, Machine learning, a probabilistic perspective. Chance. Apr. 23, 2014;27(2):62-63.

Sakoe et al., Dynamic programming algorithm optimization for spoken word recognition. IEEE transactions on acoustics, speech, and signal processing. Feb. 1978;26(1):43-9.

Salvador et al., Toward accurate dynamic time warping in linear time and space. Intelligent Data Analysis. Jan. 1, 2007;11(5):561-80.

Shalizi, Advanced data analysis from an elementary point of view. Sep. 8, 2019:828 pages.

Shazeer et al., Outrageously large neural networks: The sparsely-gated mixture-of-experts layer. arXiv preprint arXiv:1701.06538. Jan. 23, 2017:1-19.

Smith, Image segmentation scale parameter optimization and land cover classification using the Random Forest algorithm. Journal of Spatial Science. Jun. 1, 2010;55(1):69-79.

(56) References Cited

OTHER PUBLICATIONS

Srivastava et al., Dropout: a simple way to prevent neural networks from overfitting. The journal of machine learning research. Jan. 1, 2014;15(1):1929-58.
Stobbe, Road Accident Prediction and Characterization Using Convolutional Neural Networks. Master's Thesis, Institute for Data Processing Technische Universität München. Jul. 2, 2018:93 pages.
Sug, The effect of training set size for the performance of neural networks of classification. WSEAS Transactions on Computers. Nov. 1, 2010;9(11):1297-306.
Ten Holt et al., Multi-dimensional dynamic time warping for gesture recognition. Thirteenth annual conference of the Advanced School for Computing and Imaging. Jun. 13, 2007:8 pages.
Thompson, Regression methods in the comparison of accuracy. Analyst. 1982;107(1279):1169-80.
Virtanen et al., Impacts of an automatic emergency call system on accident consequences. Proceedings of the 18th ICTCT, Workshop Transport telemetric and safety. Finland 2005:1-6.
Voulodimos et al., Deep learning for computer vision: A brief review. Computational intelligence and neuroscience. 2018;2018:1-13.
Wang et al., Improving nearest neighbor rule with a simple adaptive distance measure. Pattern Recognition Letters. Jan. 15, 2007;28(2):207-13.
Werbos, Backpropagation through time: what it does and how to do it. Proceedings of the IEEE. Oct. 1, 1990;78(10):1550-60.
Witten et al., Data Mining: Practical machine learning tools and techniques. Morgan Kaufmann; 2017. Fourth Edition. 646 pages.
Xu et al., Empirical evaluation of rectified activations in convolutional network. arXiv preprint arXiv:1505.00853. Nov. 27, 2015:5 pages.
Yamane, Statistics: An introductory analysis. Harper & Row New York, NY. 1973. Third Edition. 1146 pages.
Yosinski et al., Understanding neural networks through deep visualization. arXiv preprint arXiv:1506.06579. Jun. 22, 2015:1-12.
Zhang et al., A feature selection-based framework for human activity recognition using wearable multimodal sensors. Proceedings of the 6th International Conference on Body Area Networks. ICST (Institute for Computer Sciences, Social-Informatics and Telecommunications Engineering). Nov. 7, 2011:92-98.
Zou et al., Correlation and simple linear regression. Radiology. Jun. 2003:227(3);617-628.
[No Author Listed], Regulation (EU) 2015/758 of the European Parliament and of the Council of Apr. 29, 2015 concerning type-approval requirements for the deployment of the eCall in-vehicle system based on the 112 service and amending Directive 2007/46/EC. Official Journal of the European Union. May 19, 2015. https://eur-lex.europa.eu/legal-content/EN/TXT/?uri=CELEX:32015R0758. [last accessed Dec. 5, 2019]. 17 pages.
Gurney, An introduction to neural networks. CRC press. Aug. 5, 1997:7 pages.
Hou et al., A real time vehicle collision detecting and reporting system based on internet of things technology. 2017 3rd IEEE International Conference on Computer and Communications (ICCC). Dec. 13, 2017:1135-1139.
Liao, Clustering of time series data—a survey. Pattern recognition. Nov. 1, 2005;38(11):1857-74.
Rédei, Introduction. In: Encyclopedia of genetics, genomics, proteomics, and informatics. Springer, Dordrecht. 2008:2 pages. https://link.springer.com/referencework/10.1007/978-1-4020-6754-9 [last accessed Dec. 9, 2020].
Rédei, Principal Component Analysis. In: Encyclopedia of genetics, genomics, proteomics, and informatics. Springer, Dordrecht. 2008:672.
Stobbe et al., Characterizing a Vehicle Collision. Co-pending U.S. Appl. No. 16/456,077, filed Jun. 28, 2019.
Cawse, VIN Based Accelerometer Threshold. Co-pending U.S. Appl. No. 15/530,400, filed Jan. 11, 2017.
Cawse, VIN Based Accelerometer Threshold. Co-pending U.S. Appl. No. 16/996,974, filed Aug. 19, 2020.

* cited by examiner

CHARACTERIZING A VEHICLE COLLISION

CROSS-REFERENCE TO RELATED APPLICATIONS

This application is a continuation of U.S. application Ser. No. 16/928,314, filed Jul. 14, 2020, now U.S. Pat. No. 10,843,691 B2, which is a continuation of U.S. application Ser. No. 16/456,077, filed Jun. 28, 2019, which claims the priority benefit under 35 U.S.C. § 119 of Spanish Application No. P201830655, filed Jun. 29, 2018, the entire contents of each is herein incorporated by reference.

BACKGROUND

Some organizations, including commercial enterprises or other organizations, own and/or operate a fleet of vehicles. For example, a commercial enterprise that provides goods or services to customers at customers' homes (e.g., pest control services, or grocery delivery services) may own and/or operate a fleet of vehicles used by employees and/or contractors to travel to the customers' homes.

These organizations often desire to know when one of their vehicles has been involved in a collision, so the organization can respond appropriately and effectively. The organization may want to know promptly that a collision has occurred so it can attempt to contact the employee/contractor who was operating the vehicle and determine whether the employee/contractor, or any other person, has been injured and so that emergency services can be dispatched if needed. The organization may also want to know promptly that a collision has occurred so it can promptly begin investigating the collision and determine whether the organization is likely incur any liability for the collision and, if so, so that it can begin addressing the collision appropriately.

SUMMARY

In one embodiment, there is provided a method comprising, in response to obtaining information regarding a potential collision between a vehicle and an object, obtaining, for a time period extending before and after a time of the potential collision, data describing the vehicle during the time period, the data describing the vehicle during the time period including, for each time of a plurality of times within the time period, acceleration data indicating acceleration of the vehicle at the time and speed of the vehicle at the time, classifying, using at least one trained classifier, the data describing the vehicle into at least one of a plurality of classes, each class of the plurality of classes being associated with whether a collision occurred, determining whether the potential collision is likely to have been a collision based at least in part on the at least one class identified in the classifying.

In another embodiment, there is provided at least one non-transitory computer-readable storage medium having encoded thereon executable instructions that, when executed by at least one processor, cause the at least one processor to carry out a method. The method comprises, in response to obtaining information regarding a potential collision between a vehicle and an object, obtaining, for a time period extending before and after a time of the potential collision, data describing the vehicle during the time period, the data describing the vehicle during the time period including, for each time of a plurality of times within the time period, acceleration data indicating acceleration of the vehicle at the time and speed of the vehicle at the time, classifying, using at least one trained classifier, the data describing the vehicle into at least one of a plurality of classes, each class of the plurality of classes being associated with whether a collision occurred, and determining whether the potential collision is likely to have been a collision based at least in part on the at least one class identified in the classifying.

In a further embodiment, there is provided an apparatus comprising at least one processor and at least one storage medium having encoded thereon executable instructions that, when executed by the at least one processor, cause the at least one processor to carry out a method. The method comprises, in response to obtaining information regarding a potential collision between a vehicle and an object, obtaining, for a time period extending before and after a time of the potential collision, data describing the vehicle during the time period, the data describing the vehicle during the time period including, for each time of a plurality of times within the time period, acceleration data indicating acceleration of the vehicle at the time and speed of the vehicle at the time, classifying, using at least one trained classifier, the data describing the vehicle into at least one of a plurality of classes, each class of the plurality of classes being associated with whether a collision occurred, and determining whether the potential collision is likely to have been a collision based at least in part on the at least one class identified in the classifying.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
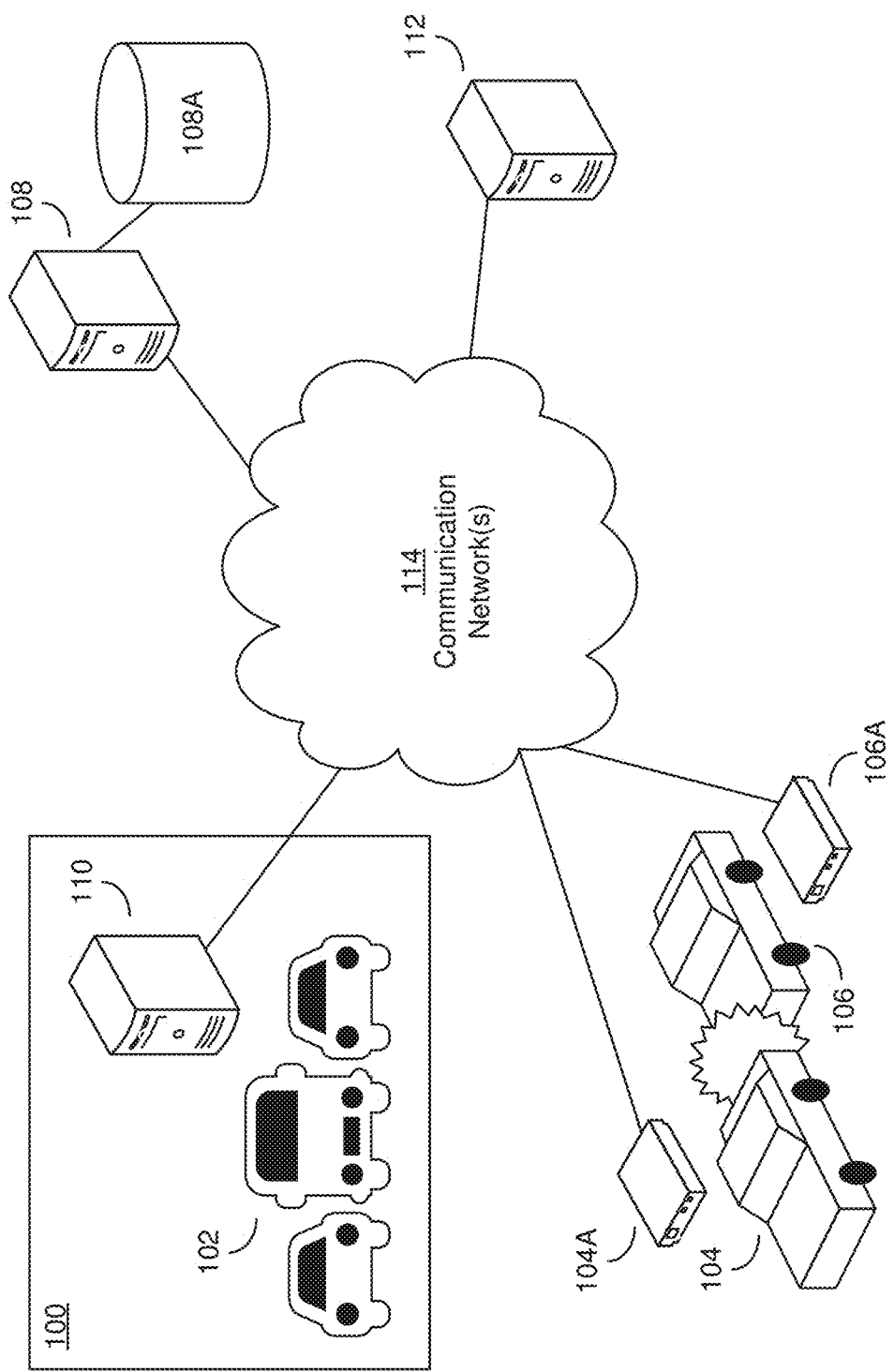
FIG. 1 is a sketch of an illustrative system with which some embodiments may operate.

Described herein are various embodiments of a system that processes information describing movement of a vehicle at a time related to a potential collision to reliably determine whether a collision occurred and to determine one or more characteristics of the collision. In some embodiments, three-axis accelerometer data may be analyzed to identify an indication of a potential collision between the vehicle and at least one other object, such as one or more other vehicles or one or more obstacles. In response to obtaining information regarding a potential collision, data describing movement of the vehicle before and/or after a time associated with the indication of the potential collision is analyzed to determine whether the collision occurred and to determine the characteristic(s) of the collision. In some embodiments, the analysis of the vehicle movement data may be carried out at least in part using a trained classifier that classifies the vehicle movement data into one or more classes, where at least some the classes are associated with whether a collision occurred and/or one or more characteristics of a collision. For example, classes may indicate, if a collision occurred, a severity of the collision and/or a direction of impact between the vehicle and the other object(s). If a collision is determined to be likely, one or more actions may be triggered based on the characteristic(s) of the collision, such as automatically attempting to contact a driver of the vehicle and/or automatically dispatching emergency services.

Different collisions have different effects on the vehicle(s) and people involved in the collisions, and thus may justify different responses. A severe collision may justify involving emergency services while a minor collision may not. A collision in which a first vehicle is struck by a second from the back may suggest fault lies primarily with the driver of the second vehicle, and different responses may be appropriate for the owner or operator of the first vehicle than for the second vehicle. Reliably determining, for a collision, whether a vehicle involved in the collision is the first vehicle (that was struck) or the second (that struck the other vehicle) may therefore aid in determining an appropriate response to the collision.

Conventionally, accelerometer data has been used to determine whether a vehicle has experienced a collision. Accelerometer data is used because accelerometers are simple devices to use and also because of the well-known relation between acceleration and force, and the conventional understanding that when a vehicle experiences a sudden acceleration/force, this is a sign that the vehicle experienced a collision. In one such conventional approach, accelerometer data is analyzed to derive an acceleration experienced by the accelerometer (and thus potentially by the vehicle) over time and to determine whether the acceleration at any time exceeds a threshold. If the acceleration exceeds the threshold, the vehicle is inferred to have experienced a collision.

The inventors have recognized and appreciated that such conventional approaches were unreliable and limited in the information they were able to provide. Often, the conventional approach suffered from false positives (flagging a collision when there was not a collision) and false negatives (not flagging a collision when there was a collision). The inventors have recognized and appreciated that this lack of reliability is because acceleration alone is not a reliable predictor of whether a collision has occurred. Vehicles or accelerometers may, under normal circumstances, experience accelerations of similar magnitude to accelerations experienced by a vehicle during a collision. For example, an accelerometer unit disposed in a passenger cabin of a vehicle may on occasion be accidentally kicked or bumped, and it is difficult to differentiate an acceleration associated with a kick or bump from an acceleration experienced during a collision. As another example, an accelerometer unit disposed in a passenger cabin of a vehicle may be loosely mounted and may move while the vehicle is operating, such as by snapping from one position to another when the vehicle is turning. When the unit moves suddenly, this may be incorrectly flagged as a collision. As a further example, a large pothole or other road deformity may, when struck by a vehicle, cause a large acceleration value that may be difficult to differentiate from acceleration values associated with collisions. Kicks or bumps, and potholes, may therefore be flagged as a collision, a false positive. Similarly, during some collisions, a vehicle may experience accelerations or forces that may be, totaled over time, substantial, but that may be at any instant low as compared to accelerations experienced during other collisions. Such a low value may be similar to other accelerations that a vehicle naturally experiences over the course of a normal drive. As a result, the accelerations associated with these collisions may be below a collision detection threshold to which the acceleration values are compared, resulting in a false negative in which a collision is not detected.

The inventors recognized and appreciated that such techniques were also limited in the information they were able to provide. These conventional techniques provided binary indicators of whether a collision had occurred. They could not reliably provide additional information characterizing the collision. Because of the unreliable nature of acceleration analysis (discussed in the preceding paragraph) and the poor link between accelerations experienced at any instant and the nature of the collision, severity information could not be reliably determined from comparison of acceleration data to thresholds. In some cases, conventionally, a maximum acceleration vector may be derived from the accelerometer data and this vector was equated to an estimate of a direction of impact in the collision. This technique, though, suffered from the same lack of reliability as the underlying acceleration data on which it is based. Vehicles involved in collisions may move in a variety of ways and directions. Simply analyzing an acceleration vector will not reliably indicate a direction of impact.

The inventors recognized and appreciated that machine learning techniques may increase reliability of processing of accelerometer data to determine information about a potential collision. For example, a classifier may be trained to classify accelerometer readings regarding a potential collision into whether a collision is or is not indicated, or a severity of the collision or other characteristics of the collision.

The inventors also recognized and appreciated, however, that while use of machine learning techniques may offer an increase in reliability, the reliability and amount of information about a collision that may be derivable solely from acceleration data from a time of a collision would still be limited. Conventional approaches focused on acceleration data inferred to be related to an instant of a collision to determine information about collision, because of what was understood to be a clear link between acceleration of an object and a force acting on that object, and because force was assumed to be most informative of the nature of a collision. As discussed above, however, the inventors have recognized and appreciated that acceleration data for a moment of a collision may not reliably characterize the collision.

The inventors thus recognized and appreciated that even if machine learning were applied, if the analysis was based on acceleration data inferred to be for a moment of impact in a collision, the analysis would still be of limited reliability. The inventors additionally recognized and appreciated that if the analysis were to include other information that has not been conventionally recognized as informative as to the nature of a collision, this would increase the reliability and amount of information that may be determined about a collision. Such other information has not been conventionally collected or analyzed as part of collision analysis.

For example, the inventors recognized and appreciated that speed information for a vehicle, from a time surrounding a collision, may be informative as to whether a collision has occurred. Often, it is presumed that a vehicle simply decelerates and stops moving at a time of a collision. The inventors recognized and appreciated that this is an incorrect presumption for many collisions. Often, a vehicle may continue traveling for 3, 5, or 10 seconds following a collision. Over the time of the collision and following the collision, acceleration values may not necessarily indicate that the vehicle clearly experienced a collision because, as discussed above, the acceleration that the vehicle experiences at any time during a collision may not be high. When a vehicle's speed is reduced to 0, though, this may be a sign that the vehicle may have experienced an event, which may have been a collision. Together with this additional information that suggests a collision may have occurred, acceleration values from prior to the vehicle stopping may be analyzed for signs of a collision. Those signs, as should be appreciated from the foregoing, may not themselves clearly look like a collision, but when used together with speed information may more clearly signal that it is likely that a collision occurred. For example, if other data indicates an event that may or may not be a collision at one time, and the vehicle's speed drops to 0 within a few seconds following that suspect event, this may suggest that the suspect event is more likely to be a collision.

The inventors further recognized and appreciated that reliably determining whether a collision has occurred and determining information characterizing the collision may be enabled by monitoring movements of a vehicle for a longer period of time surrounding a collision. Conventional approaches focused on an instant in time, which was inferred to be the instant of first impact for a collision. The inventors recognized and appreciated, however, that some collisions may last quite some time, such as for more than a second or even up to 10 seconds. Reviewing movement information for the entirety of the collision may help in characterizing the collision. Beyond that, though, the inventors recognized and appreciated that by reviewing movements of a vehicle from a time starting before a collision and lasting until a time following the collision, the reliability of determining whether a collision occurred and the reliability of characterizing the collision may be increased.

The inventors have thus recognized and appreciated that it may be advantageous to try to determine a window of time that surrounds a potential collision, starting before the collision and ending after the collision. Movement information for a vehicle in such a time period may then be analyzed to determine whether the potential collision is likely to have been a collision and, if so, to determine information about the collision, such as severity information and/or direction of impact of the collision, or other information.

The inventors have thus recognized and appreciated that it may be advantageous to determine an indication of a potential collision, from which a time period may be generated and movement information for the time period collected for analysis. While acceleration data has limited reliability, as discussed above, for use as a sole factor in collision analysis, if analyzed in a particular manner it may be useful as an indicator of a potential collision, for use in determining the time period. For example, while each of the three acceleration values generated by a three-axis accelerometer, each of which indicates an acceleration in one of three directions (forward-backward, right-left, and up-down) may be of limited use in some cases in indicating occurrence of a collision, together these values may be more indicative of potential collision. Taken together, the three values may be used to produce a scalar value that indicates a total acceleration of a vehicle at an instant. This total acceleration value, if above a threshold, may be indicative of a sudden event that the vehicle experienced that caused the vehicle to suddenly accelerate. This may be a collision or, of course (due to the limited information available from acceleration data) a pothole or other road deformity. But, this may be sufficiently informative of a potential collision to define a time period from before and after the instant associated with that acceleration, which may be further analyzed to determine whether a collision occurred and to characterize the collision. Such an analysis may, as discussed above, be performed at least in part using a trained classifier.

The inventors have further recognized and appreciated that other information describing a vehicle involved in a potential collision may also aid in determining whether a collision occurred and/or in characterizing the collision. For example, data generated by the vehicle's Engine Control Unit (ECU) and/or otherwise available from or via the vehicle's On-Board Diagnostics (OBD) system (which, as used herein, also refers to an OBD-II system) may aid in determining whether a collision occurred. For example, information indicating whether any of the vehicle's airbags were deployed may be a strong indicator that a collision occurred. Using this as a strong sign that a collision occurred, movement information (e.g., accelerometer and/or speed data) might be analyzed characterize the collision, such as the severity of the collision and/or a direction of impact. As another example, if any of a vehicle's sensors indicated a fault at a time of a potential collision, this may be a sign of damage associated with a collision and indicative that the potential collision was a collision. Movement information may then be analyzed to characterize the collision.

In view of the foregoing, techniques are described herein for monitoring movement information for a vehicle to identify an indication of a potential collision. The indication of the potential collision may be, for example, a determination that a scalar value derived from three-axis accelerometer data indicates a magnitude of total acceleration at a point in time that is above a threshold value. Rather than a determination from acceleration data being taken as conclusive evidence of a collision, as in conventional approaches, and rather than information about this point in time driving the analysis, this point in time is used in some embodiments as a point from which to define a time period, and for obtaining for the time period additional movement data for the vehicle that indicates movements of the vehicle before and after a time associated with the indication of a potential collision, and/or for obtaining data from the vehicle that indicates a status of one or more systems or components of the vehicle during the period of time.

The movement data that is obtained before and after the time may include, for example, multi-axis (e.g., three-axis) accelerometer data for multiple points over a time period that extends before and after the time. The movement data may additionally include a scalar value for each point that indicates a magnitude of total acceleration experienced by the vehicle (or by the accelerometer) at that point. In addition, movement information may include speed of the vehicle at each point. This movement information, including for each point the three-axis accelerometer data indicating an acceleration in each of three directions, a magnitude of total acceleration, and/or a speed, may be analyzed with a trained classifier to determine whether the indication of a potential collision is associated with a likely collision. The trained classifier may additionally or alternatively be used to analyze the vehicle movement information to determine one or more characteristics for such a collision. Such characteristics may include a severity of the collision and/or a direction of impact of the collision.

In some embodiments, if a collision is determined to be likely, one or more actions may be triggered based on the characteristic(s) of the collision, such as automatically attempting to contact a driver of the vehicle and/or automatically dispatching emergency services.

Described below are illustrative embodiments of approaches for obtaining and analyzing vehicle information to reliably determine whether a vehicle has experienced a collision and/or one or more characteristics of such a collision. It should be appreciated, however, that the embodiments described below are merely exemplary and that other embodiments are not limited to operating in accordance with the embodiments described below.

FIG. 1 illustrates a computer system with which some embodiments may operate. FIG. 1 includes an organization 100 that may operate a fleet of vehicles 102. The organization 100 may be a commercial enterprise, a government or government agency, a not-for-profit organization, or a non-profit organization, or any other organization. Embodiments are not limited to operating with any particular form of organization, or with formal or informal organizations. Illustrative examples of such an organization include a commercial service that delivers goods and/or services to customers' homes or businesses, a business that rents vehicles, a municipality that operates vehicles within the municipality (e.g., vehicles to perform public works projects, public safety vehicles like police cars, fire trucks, and ambulances, etc.). The vehicles of the fleet 102 may be operated by employees and/or contractors of the organization 100, or by others (e.g., customers of a rental car agency may drive the cars).

The organization 100 may want to be notified promptly when any of the vehicles 102 are involved in a collision. The organization 100 may wish to respond to such a collision by determining whether the driver (e.g., the employee or contractor) or any other person was injured. The organization 100 may also wish to respond to a collision by determining whether the vehicle is still safe to operate, or has been damaged to the point that it should not be operated and another vehicle should be sent to act in the place of the damaged vehicle (e.g., by taking on deliveries that the damaged vehicle was to have made, or otherwise providing service the damaged vehicle was to be operated to perform). Such information might be inferred or determined from an indication of a severity of a collision. More severe collisions may be more likely than less severe collisions to result in injuries or result in vehicles that can no longer be safely operated. Accordingly, if severity of a collision could be determined, the organization 100 may also be able to estimate whether anyone was injured or whether the vehicle can still be safely operated.

The organization 100 may also want to know, when a collision has occurred, the likelihood that it will incur liability for the collision. Fault for different collisions falls with different parties, and the fault may be inferred from a manner in which two vehicles collided. The angle at which a vehicle in the fleet 102 struck or was struck by another object (e.g., another vehicle or obstacle) may thus be indicative of who is at fault for the collision, and may be indicative of whether the organization 100 will incur liability. For example, if a vehicle in the fleet 102 is hit from behind by another vehicle, it may be less likely that the driver of the vehicle in the fleet 102 is at fault and less likely that the organization 102 will incur liability. If the vehicle in the fleet 102 hits another vehicle with its front end, though, it may be more likely the driver of the vehicle in the fleet 102 is at fault and more likely that the organization 102 will incur liability.

Accordingly, if angle of impact information can be determined for a vehicle involved in a collision, the organization 100 may be more effectively able to determine who may be at fault and whether it is likely to incur liability.

FIG. 1 also illustrates a collision between two vehicles 104, 106, in which vehicle 104 is being struck from behind by vehicle 106. In this example, vehicle 104 is a member of the fleet 102. Techniques described herein may be used to obtain movement information for vehicle 104 that may be analyzed to determine whether a collision occurred and to characterize the collision, including by determining a severity of the collision and/or angle of impact on vehicle 104.

In some embodiments, each of the vehicles 104, 106 may be respectively equipped with a monitoring device 104A, 106A. The monitoring device 104A, 106A may include a three-axis accelerometer that indicates acceleration of the device over time, which may be indicative of acceleration of the associated vehicle over time. The device 104A, 106A may be equipped to produce an accelerometer value at a set interval, such as multiple times per second (e.g., 100 times per second), once per second, or at another suitable interval. In some embodiments, the monitoring devices 104A, 106A may also be equipped to obtain information from one of the associated vehicles. For example, a monitoring device 104A, 106A may be equipped to connect to an OBD port of an associated vehicle and obtain information from an ECU or OBD system of the vehicle. Such information may include fault messages generated by the ECU or OBD system, or messages indicating a state of components of the vehicle, such as messages indicating whether an air bag has deployed.

A collision detection facility may be implemented as executable instructions and may analyze information generated or obtained by a monitoring device 104A, 106A. The collision detection facility may analyze the information to determine whether a vehicle associated with the monitoring device 104A, 106A has experienced a collision and, if so, determine one or more characteristics of the collision (e.g., severity, angle of impact).

In some embodiments, the collision detection facility may be implemented in (e.g., stored by and executed by) the monitoring device 104A, to make such determinations about vehicle 104. In other embodiments, the collision detection facility may be implemented by another device of the vehicle 104, such as a computing device integrated with the vehicle 104 (e.g., the ECU, or a computer of the OBD system), or a computing device disposed in a passenger cabin of the vehicle 104. Such a computing device disposed in the passenger cabin may be a mobile device (e.g., smart phone, tablet, etc.) or personal computer (e.g., laptop computer), or other suitable device. In other embodiments, the collision detection facility may be implemented remote from the vehicle 104. In the embodiment of FIG. 1, for example, the collision detection facility may be implemented in one or more servers 108 located remote from the vehicle 104. For example, the server 108 may be one or more servers operated by a vendor of the monitoring device 104A, one or more servers operated by the organization 100, operated by a cloud computing platform, or other servers.

In still other embodiments, operations of the collision detection facility described herein may not be implemented wholly in one location or another, but may be split in any suitable manner. As one such example, operations of a collision detection facility to determine whether a collision has occurred may be implemented within the monitoring device 104A or otherwise local to the vehicle 104, whereas operations to characterize a collision, once it is determined that a collision is likely to have occurred, may be implemented remote from the vehicle 104 in the server(s) 108.

Regardless of where it is implemented, in accordance with some techniques described herein, the collision detection facility of the example of FIG. 1 may make use of a trained classifier to determine whether a collision has occurred and/or to characterize the collision. The trained classifier may have information associated with each of the classes with which it is configured, illustrated in FIG. 1 as data store 108A. That information may be used by the trained classifier to analyze information about the vehicle 104 obtained by the monitoring device 104A, including movement data or other data, and determine a class that best matches the obtained data.

Each of the classes may be associated with whether or not a collision has occurred and/or, if a collision has occurred, one or more characteristics associated with the collision. For example, classes may be associated with a binary decision of whether a collision occurred or did not occur. As another example, classes may be associated with different levels of likelihood that a collision occurred. As a further example, classes may be additionally or alternatively associated with one or more characteristics of a collision, such as a severity of a collision, different levels of severity of a collision, different angles of impact, or other characteristics of a collision.

Additional information regarding examples of use of a trained classifier is provided below in connection with FIGS. 2-5E.

In embodiments in which the collision detection facility is implemented remote from the monitoring device 104A, the monitoring device 104A may communicate obtained data to the collision detection facility. The monitoring device 104A may include communication components, such as one or more wireless transceivers. The wireless transceiver(s) may include, for example, components for communicating via a Wireless Wide Area Network (WWAN), such as via a cellular protocol such as the General Packet Radio Service (GPRS), Universal Mobile Telecommunications Service (UMTS), Enhanced Data Rates for GSM Evolution (EDGE), Long-Term Evolution (LTE), or other suitable protocol. In some such embodiments, the monitoring device 104A may directly communicate with one or more networks outside the vehicle 104 to communicate data to the collision detection facility. In other embodiments, the monitoring device 104A may communicate to such networks via another device disposed local to the vehicle 104. For example, the vehicle 104 may include communication components for communicating via a WWAN and the monitoring device 104A may communicate to the vehicle 104 to request that data obtained by the monitoring device 104A be sent to the collision detection facility. As an example of such an embodiment, the monitoring device 104A may include components to communicate via a Controller Area Network (CAN) of the vehicle 104 and request that obtained data be transmitted from the vehicle 104. In still other embodiments, the monitoring device 104A may communicate via a mobile device local to the vehicle 104, such as a mobile device operated by a driver of the vehicle 104. The mobile device may be, for example, a smart phone or tablet computer. In such an embodiment, the monitoring device 104A may communicate with the mobile device via a Wireless Local Area Network (WLAN) or Wireless Personal Area Network (WPAN), such as any of the IEEE 802.11 protocols or any of the Bluetooth® protocols, to request that obtained data be sent to the collision detection facility.

Together with obtained data describing movements of the vehicle or other information, the monitoring device 104A may transmit to the collision detection facility one or more identifiers for the vehicle 104 and/or for the monitoring device 104A, to indicate that the transmitted data relates to the vehicle 104. Embodiments are not limited to operating with a particular form of identifier. In some embodiments, a Vehicle Identification Number (VIN), a license plate number, or other identifier may be used. The collision detection facility may receive this information from a monitoring device, which may be configured with this information, such as by receiving the information as input when the monitoring device is installed in the vehicle 104. The collision detection facility may also receive this information when the collision detection facility is executing on a computing device integrated with the vehicle 104 (in which case the facility may obtain the identifier from memory), or when the facility receives data from or via the vehicle 104, in which case one or more components of the vehicle may add the identifier to the information that is sent.

In some embodiments, an identifier or contact information for a driver of the vehicle 104 may be obtained and transmitted. For example, a phone number that may be used to contact the driver of the vehicle 104 may be sent. This may be sent in embodiments in which the collision detection facility is executing or, or receives data from or via, a mobile device of the driver, in which case the mobile device may send data from the monitoring device 104A together with the phone number. In other embodiments, a driver of the vehicle 104 may "log in" to the monitoring device 104A or otherwise configure the monitoring device 104A when first operating the vehicle 104, and as part of that configuration may provide an identifier and/or phone number for the driver.

In some embodiments, location data for the vehicle 104 may also be sent to the collision detection facility. For example, the monitoring device 104A may include Global Positioning System (GPS) hardware to determine a location of the monitoring device 104A, or the monitoring device 104A may obtain from vehicle 104 information describing a location of the vehicle 104. The monitoring device 104 may also transmit this location information to the collision detection facility.

The collision detection facility, upon analyzing the data and determining one or more classes that likely describe the suspect collision, may report the suspect collision to the organization 100. For example, the collision detection facility may communicate to one or more servers 110 associated with the organization 100. The server(s) 100 may be associated with a call center or other employee or group of employees tasked with reviewing and potentially responding to collisions or potential collisions. The server 100 may thus be operated by the organization 100 and/or by a service provider that the organization 100 has engaged to monitor and respond to collisions or potential collisions.

The collision detection facility may provide various information to the organization 100 when reporting a collision or potential collision. For example, if the collision detection facility determines one or more characteristics of the potential collision, such as a severity and/or angle of impact for the collision, the characteristic(s) may be sent to the organization 100. In some cases, some of the data obtained by the monitoring device 104A and sent to the collision detection facility may be sent. For example, if data was obtained from the vehicle 104, such as information indicating whether an air bag was deployed, this information may be sent to the organization 100. The identifier for the vehicle 104 and/or the monitoring device 104A may be transmitted, so the organization 100 can identify a vehicle to which the report relates. In embodiments in which the collision detection facility receives an identifier or contact information for a driver, the identifier or contact information may also be sent. In embodiments in which location information for the vehicle 104 is received by the collision detection facility, the location information may also be sent to the organization 100.

Upon receipt of a report of a collision or potential collision at the organization 100, the organization 100 may determine whether and how to respond. The response of the organization 100 may be manual and/or automatic, as embodiments are not limited in this respect. In embodiments in which the response of the organization 100 is at least partially automatic, the automatic response may be generated using rules that evaluate information received from the collision detection facility. For example, if a report from a collision detection facility indicates that the vehicle 104 is likely to have experienced a severe collision, and the report includes location information, this information may satisfy conditions associated with triggering dispatch of emergency services to the location, and the server(s) 110 may trigger that dispatch without human intervention, such as by sending location information and/or identifying information to the dispatcher. In other cases, though, a person may review the report from the collision detection facility and determine how to respond. The person may respond by attempting to contact a driver of vehicle 104, such as using received contact information for the driver, to inquire as to health or safety of the driver or others. The person may also contact emergency services and/or roadside assistance services in an area in which the vehicle 104 is located, to request dispatch of emergency services or roadside assistance to the vehicle 104 using the location information and/or identifying or contact information.

Automatically and/or manually carrying out these or other responses may, in some embodiments, include communicating with one or more computing devices 112 associated with one or more service providers, such as emergency services or roadside services.

Communications in the computer system of FIG. 1 may be carried out using one or more wireless and/or wired networks, including the Internet, generally depicted in FIG. 1 as communication network(s) 114. It should be appreciated that the communication network(s) may include any suitable combination of networks operating with any suitable communication media, as embodiments are not limited in this respect.

Figure 2:
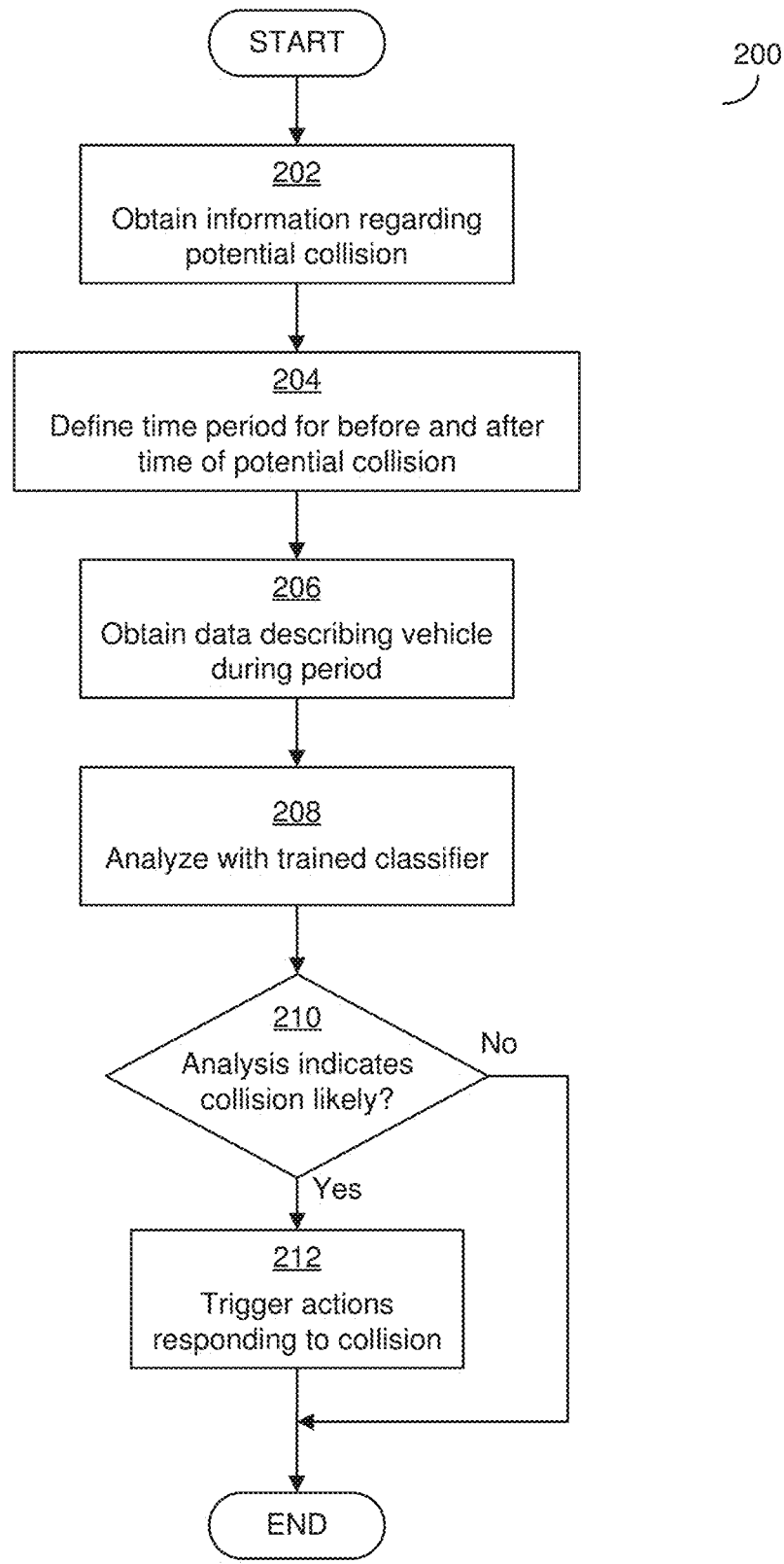
FIG. 2 is a flowchart of a process that may be implemented in some embodiments to characterize a collision using a trained classifier.

FIG. 1 illustrated examples of components of a computer system with which some embodiments may operate. Described below in connection with FIGS. 2-5E are examples of implementations of a collision detection facility, including techniques for training a collision detection facility. These embodiments may operate with a computer system like the one shown in FIG. 1, or with another form of computer system FIG. 2 illustrates an example of a process that may be implemented by a collision detection facility in some embodiments. The process of FIG. 2 may be implemented local to a vehicle (e.g., in a monitoring device of FIG. 1) and/or remote from a vehicle. In some embodiments, for example, part of the process 200 of FIG. 2 may be implemented local to a vehicle, such as operations of blocks 202-206 of the process 200, while another part of the process 200 may be implemented from a vehicle, such as operations of blocks 208-212.

The process 200 begins in block 202, in which a collision detection facility obtaining information regarding a potential collision.

In some embodiments, the collision detection facility may obtain information regarding a potential collision by monitoring over time a magnitude of total acceleration experienced by an accelerometer of a vehicle and/or of a monitoring device. The total acceleration may be a value derived from acceleration detected by the accelerometer in different axes. For example, in a case that the accelerometer is a three-axis accelerometer, the total acceleration may be derived from computation performed on acceleration experienced in each of the three axes. The three axes may be forward-backward, right-left, and up-down in some cases. In some embodiments, the magnitude of total acceleration may be calculated as the square root of the sum of the squares of the acceleration in different direction. For example, if the acceleration in the forward-backward direction is assigned to "x", the acceleration in the right-left direction to "y," and the acceleration in the up-down direction to "z," the magnitude of the total acceleration may be:

$$acc_{total} = \sqrt{x^2 + y^2 + z^2}$$

The magnitude of the total acceleration is a scalar value. This value may be used in block 202 as part of obtaining information on whether the vehicle has experienced an event that may (or may not be) a collision—a potential collision.

For example, in some embodiments, if the vehicle experiences a total acceleration at a time that is above a threshold, this may be taken as a sign of a suspected collision that is to be further evaluated to determine whether it is a collision or is not a collision. As should be appreciated from the foregoing, acceleration alone is seldom a reliable indicator of a collision, as other events may also be associated with high accelerations, such as a kick or bump of a monitoring device or the vehicle striking a pothole or other road deformity. Accordingly, the magnitude of total acceleration is not taken as a sign of a collision, but rather used as a sign of a potential collision that is to be investigated further.

Thus, in block 202 in some embodiments, the collision detection facility determines the total acceleration over time, such as at a time interval. That time interval may be, for example, multiple times per second (e.g., 100 times per second), once per second, or other suitable interval, then determines whether the total acceleration at any time exceeds a threshold. If not, the collision detection process ends. In some embodiments, the collision detection facility may return to block 202 and continue monitoring the total acceleration over time, or otherwise obtaining information on a potential collision.

It should be appreciated, however, that embodiments are not limited to using a threshold to determine whether a potential collision has occurred, as embodiments may obtain information regarding a potential collision in other ways.

For example, in some other embodiments, an indication of a potential collision may be obtained by identifying a total acceleration that is a largest in a time period. When a magnitude of total acceleration at a time exceeds the magnitude of total acceleration of other times, such as other times within a time window surrounding a time being analyzed, that higher total acceleration may be taken as an indication of a potential collision. This may be the case even if the magnitude of acceleration at that time is lower than the magnitude at other times. In such a case, the collision detection facility may use a sliding time window to, over time, analyze acceleration data within the time window to determine magnitude of total acceleration at times within the time window and to determine the highest magnitude in the window. The time of that highest magnitude may then be taken as a time of a potential collision and taken in block 202 as information regarding a potential collision.

In some other embodiments, rather than the collision detection facility using a sliding time window to identify a maximum total acceleration within the time window, a sliding time window may be used that determines every successive point in time to be an indication of a potential collision. At each time step, a next acceleration sample may be taken as an indication of a potential collision, and taken in block 202 as information regarding a potential collision.

Once the collision detection facility obtains information regarding a potential collision in block 202, then in block 204 the collision detection facility defines a time period that spans a time before and after the time at which the total acceleration exceeded the threshold. The time may be long enough to last before and after a collision, if the time of the potential collision is at the beginning, during, or at the end of a collision. For example, if collisions are determined to last at least three seconds, the time period may be 6 seconds long: three seconds before the time of the potential collision, and three seconds after. If collisions are determined to last at least 5 seconds, the time period may be 10 seconds. The inventors recognized and appreciated that some collisions may last up to 10 seconds, so a time period of 20 seconds may be advantageous. It should be appreciated, though, that embodiments are not limited to being implemented with any particular time period. Further, while in some embodiments the time period may be symmetrically defined around the time from block 204, in other embodiments the time period may be asymmetrically defined.

In block 206, the collision detection facility obtains data describing the vehicle during the time period defined in block 204. The data that is obtained may be movement data describing movements of the vehicle in the time period. The data describing the movements may be acceleration data indicating an acceleration of the vehicle in three axes at intervals (e.g., the same interval that may be used in block 202 to obtain acceleration data) during the time period. In some embodiments, the acceleration data may also be processed to determine additional information describing movements of the vehicle in the time period. For example, for each set of acceleration data for each interval, a magnitude of total acceleration may be determined, in the same manner that may have been used, in some embodiments, in block 202. As another example, speed of the vehicle at the interval may be determined. In some embodiments, speed information may be determined from calculations performed on accelerations over time, potentially together with location data.

In some embodiments, in addition to or as an alternative to acceleration information, other data describing the vehicle may be obtained. For example, the collision detection facility may obtain data from a vehicle, such as from an ECU or OBD system of the vehicle. The obtained information may include, for example, speed at each of the times for which acceleration data was obtained. The obtained information may additionally or alternatively include messages generated by one or more components of the vehicle, such as information indicating a state of the component(s). The state information may include, for example, whether any of the components of the vehicle have generated a fault message and/or have changed a state, such as, for an air bag system, whether an air bag deployed. The data that is obtained from the vehicle may be information for the time period defined in block 204.

In block 208, the information that is obtained in block 206 is analyzed with a trained classifier of the collision detection facility. As discussed above in connection with FIG. 1, the trained classifier may include multiple different classes that are associated with vehicle data for different scenarios, where the scenarios include whether a collision occurred and/or characteristics of collisions (e.g., severity, angle of impact, etc.).

Each class may be associated with data describing combinations of data (e.g., movement data or other data) that are associated with the scenario described by the class. For example, if a class is associated with a collision having occurred and with a collision that is a severe collision in which the vehicle was rear-ended by another, the class may be associated with characteristics of movement data and/or other data that define such a severe rear-end collision. This information may define the class and be used to determine whether new data (for a potential collision to be analyzed) fits any of the classes.

Each class may be defined by different movement data because each type of collision may be associated with different movements, which allows for differentiating collisions, and because normal vehicle operations (with no collision) may also be associated with movements that differ from movements associated with collisions, which allows for differentiating collisions from normal driving. For example, a straightforward rear-end collision may include movements that are primarily forward-backward movements. A collision in which the vehicle is struck broadside by another vehicle may, on the other hand, be associated with right-left movement data. If data is input for a suspected collision, and that data includes primarily forward-backward movements and includes very little right-left movement, it may be more likely that the suspected collision is a rear-end collision than that the suspected collision is a broadside collision. Severe collisions may also demonstrate different movements than not-severe collisions, and not-collisions may demonstrate different movements than collisions. A comparison of data for a suspected collision to data describing different classes of collisions may therefore allow for determining whether a collision occurred and/or for determining one or more characteristics of a collision.

Accordingly, when the data obtained by monitoring device 104A is analyzed with the trained classifier, the movement data and/or other data may be compared to each of the classes defined by the trained classifier. The collision detection facility may generate a probability indicating a level of match between each of one or more classes and the data. The probability for a class indicates a likelihood that the information associated with that class is an accurate description of the data. For example, for the example class above that is associated with a collision having occurred that is a severe rear-end collision, the input data may be compared to determine whether it matches the data for that class. If the collision actually was a severe rear-end collision, the input data may appear similar to the data for the class and a high probability of match may be generated. If, however, the input data is associated with a not-severe front-end collision, there may not be a high degree of match to the severe rear-end collision class and, accordingly, a low probability of match may be generated by the collision detection facility. In such a case, though, the trained classifier may have another class for a not-severe front-end collision, and there may be a high probability of match to that class. As a result, the collision detection facility may generate a probability of match between the input data and each of one or more classes maintained by the trained classifier.

These probabilities may be used to determine whether a collision occurred and/or characteristics of the collision. For example, a class that has a highest probability may be selected as the accurate answer, and the collision information for that class (whether a collision occurred and/or characteristics of such a collision) may be chosen as the likely correct descriptor of the collision. As another example, the probabilities may be compared to a threshold to determine whether any of the probabilities for any of the classes are above the threshold. If so, all of the classes for which a probability are above a threshold may be reported as potential matches for the suspected collision, for a user to review each of the potential matches and the collision information for each of the potential matches. As another example, the probabilities may be compared to determine whether one or more of the probabilities differ from others by more than a threshold amount, such that one or more could be determined to be potential correct matches whereas others are, as compared to those one or more, less likely to be correct. Those one or more that stand out from the others may then be reported as potential matches for the suspected collision, for a user to review each of the potential matches and the collision information for each of the potential matches. Embodiments are not limited to any particular manner of analyzing probabilities and selecting one or more potential correct matches from the probabilities.

Accordingly, by comparing the data obtained in block 206 to the data defining the different classes/scenarios, the trained classifier can determine which of the classes is a likely match or best match for the data obtained in block 206. The collision detection facility may therefore, in block 208, determine one or more classes that are a likely or best match to the data obtained in block 206.

In block 210, based on the class(es) determined in block 208, the collision detection facility determines whether the potential collision from block 202 is likely to be or have been a collision. This may include determining whether the class that best matches the data obtained in block 206 is a class associated with a collision, or whether any of the classes to which the obtained data is a good match is a class associated with a collision. This may alternatively include determining whether a probability of match to any class associated with a collision exceeds a threshold, or whether a probability of match to any class associated with no collision exceeds a threshold.

If it is determined in block 210 that a collision is not likely, then in the embodiment of FIG. 2 the collision detection process may end, or return to block 202 and continue monitoring acceleration over time or otherwise obtaining information regarding another potential collision.

If, however, the collision detection facility determines in block 210 that a collision is likely to have occurred, then in block 212 the collision detection facility triggers actions responding to the collision. This may include notifying an operator of a fleet of vehicles of which the vehicle is a member, notifying roadside assistance, notifying emergency services, attempting to contact a driver of the vehicle, or other actions discussed above. Once the actions are triggered, the collision detection facility may end the process 200, or continue monitoring in block 202, with either monitoring the vehicle that experienced the collision or monitoring other vehicles.

In some embodiments, the collision detection facility may evaluate a class identified as the most likely match for a suspected collision for which data was received and analyzed by the collision detection facility. If the best match determined by the classifier indicates that a collision is unlikely to have occurred, the collision detection facility may not report the potential collision to the organization 100. If, however, the collision detection facility determines that a collision may have occurred, the facility may report the potential collision to the organization 100. In other embodiments, however, the collision detection facility may report to the organization 100 every potential collision it analyzes, but may report the potential collision to the organization 100 together with a value indicating a probability that the potential collision was a collision. A person at the organization 100 (or a vendor for the organization 100) reviewing the report may then analyze the likelihood that the potential collision was a collision and, based on the probability, determine whether and how to respond.

In one example described above of the implementation of block 202, the time period is defined in block 204 to be a time period surrounding a time at which a total acceleration exceeded a threshold, which is one example of a way in which information regarding a potential collision may be obtained. In some embodiments, the time at which a total acceleration exceeds a threshold may trigger an analysis of a time period before and after that time, to identify a maximum total acceleration in the time period. This time period may be the same or different than the length of the time period of block 204. In some such embodiments, once the maximum total acceleration in the time period is determined, the time period of block 204 is defined based on a time associated with that maximum total acceleration, and data is obtained in block 206 for that time period.

The collision detection facility was described in connection with the examples of FIGS. 1 and 2 as implementing machined learning techniques, using a trained classifier. It should be appreciated that embodiments are not limited to implementing the trained classifier or the machine learning techniques in any particular manner.

Figure 3A:
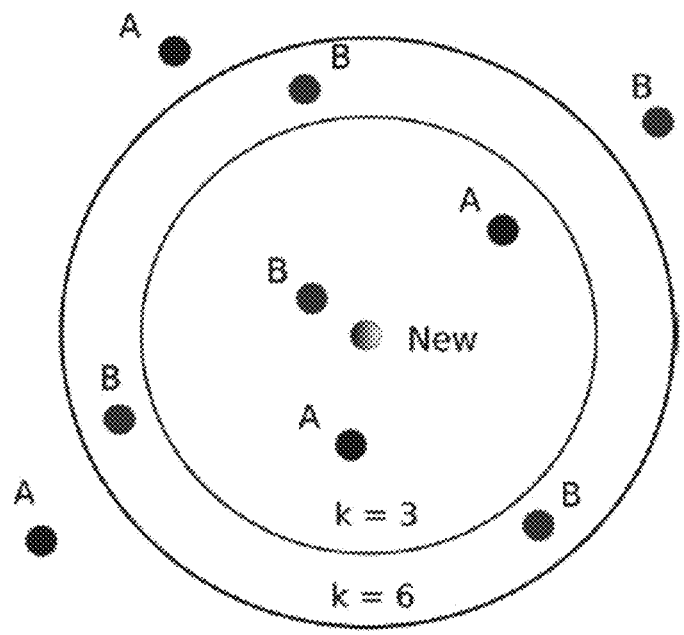
FIGS. 3A-3I illustrate examples of machine learning techniques with which some embodiments may operate.

In some embodiments, the machine learning may be implemented using a k-Nearest Neighbor technique. k-Nearest Neighbor (short k-NN) is an example of instance-based learning. This means that the training data is being stored for comparison purposes. New data will be classified by taking a defined number of the closest training data into consideration. The k-NN algorithm is explained in the following example shown in FIG. 3A. The goal is to determine a classification of the "New" data point by considering how similar it is to its neighbors in the graph. The "New" data point is positioned in the graph at coordinates determined by one or more data values associated with the "New" data point. The "k" in the k-Nearest Neighbor algorithm refers to how many other data points are chosen for evaluation. Points are chosen for having a closest linear distance to the "New" data point in the graph. FIG. 3A shows two different options, one with k=3 and one with k=6. When three neighbors are considered, it is seen that two of the three are class "A" while only one is class "B," and thus the "New" data point will be determined to be a member of class "A." On the other hand, in the example where six neighbors are considered, only two of the six are class "A" while the other four are class "B." As such, for the k=6 example, class "B" will be chosen for the "New" data point. k-NN is a good choice for a trained classifier for a small data set with few dimensions, because of its high reliability and computational simplicity in these situations.

Figure 3B:
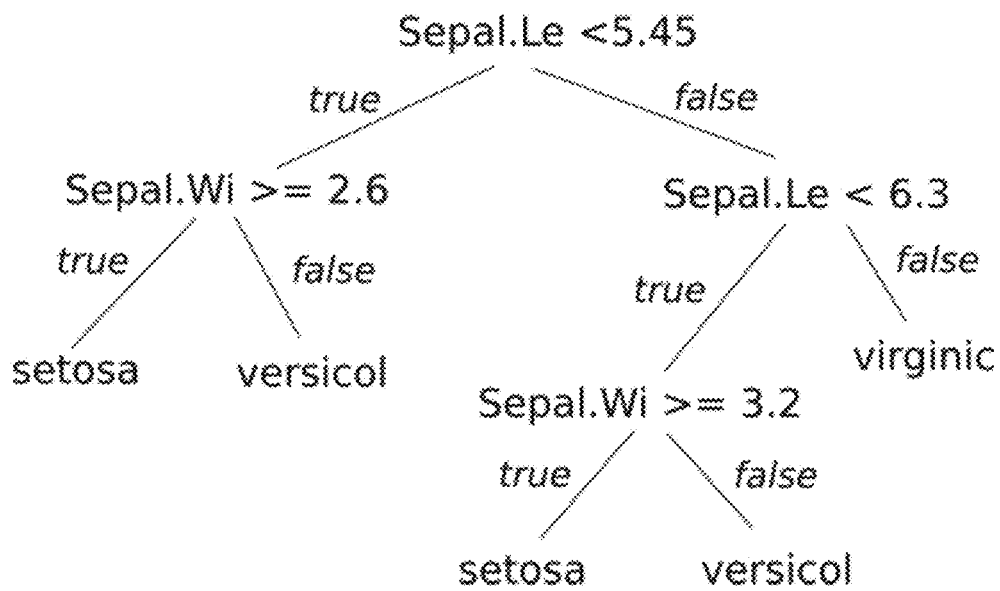
Figure 3C:
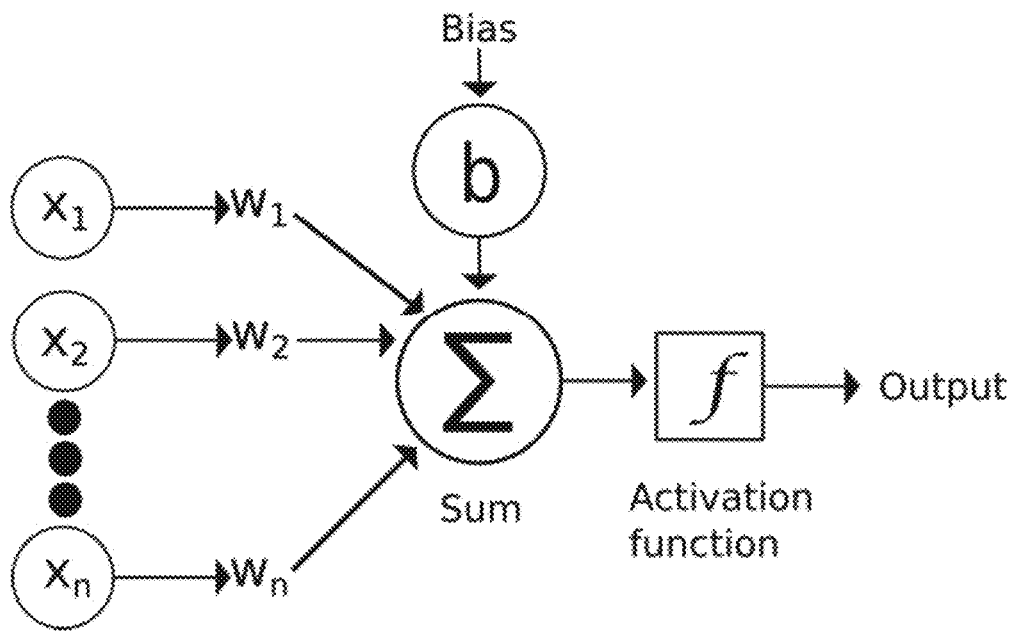

In other embodiments, a Random Forest (RF) technique may be used. RF belongs to the machine learning category called "decision trees" and can be applied to classification tasks. Well-advanced trees which are the foundation of the RF. An RF model is trained by creating a decision tree that can represent most of the training data, by creating paths through the tree to labels reflected in the training data. The tree will then be evaluated for new input data and will output a predicted label at the end of the path. FIG. 3B shows a small decision tree with four branches for classifying specific flowers based on the sepal length and width of the flowers.

One advantage of decision trees is the ease of understanding the model. The predictor space is segmented in a number of simple regions which can be defined by splitting rules. Splitting rules are the basic element of decision trees. One drawback of decision trees, however, is a potentially poor accuracy and a high risk of overfitting the decision tree to the training data. "Overfitting" may occur when a very detailed tree is created with hundreds of nodes that works perfectly on the training data, but has poor results when applied to data not in the training set.

One modification of a standard decision tree algorithm is called "Bagging." This method uses, instead of one decision tree, multiple decision trees. In some cases, hundreds of independent decision trees may be constructed by using a bootstrap sample of the dataset. To classify new input data, the data is processed using all or multiple of the trees and a majority vote is taken over the generated predictions. Bagging can be used for regression and classification tasks.

By adding even more randomness to Bagging, a Random Forest algorithm is implemented. In RF trees, each tree or each node is randomly taking several features of input data into consideration. The random feature selection creates independency around the trees compared to regular Bagging. Most times the algorithm obtains better results than Bagging, because of better variance and bias tradeoffs. Extremely randomized trees take this even further.

In other embodiments, the trained classifier may be advantageously defined using a neural network, such as a convolutional neural network (CNN). The inventors have recognized and appreciated that in some cases, a CNN may provide for higher reliability and accuracy than other machine learning techniques.

Neural networks are implemented as mathematical models that are viewed as something of a metaphor for or simulation of functions of neurons of an organic brain. Some neurons inside of a brain perform a simple task equivalent to outputting an electric signal when the input into the neuron exceeds a predetermined threshold. Warren McCulloch and Walter Pitts designed the first computational model in 1943 that simulated a neuron with the help of mathematics and a threshold logic for the activation. The basic structure of a neuron is displayed in the FIG. 3C. The inputs $x_1, x_2, \ldots, x_n$ are multiplied with weights named $w_1, w_2, \ldots, w_n$. These are then added together with a bias node called b. This value is passed through an activation function. The type of function chosen depends on the use case and implemented layer. A reason to add a bias is for example to shift the activation function, in which case only higher x values would produce an output. The output can be represented as a value z with the following formula:

$$z = b + \sum_{i=1}^{n} w_i x_i$$

Figure 3D:
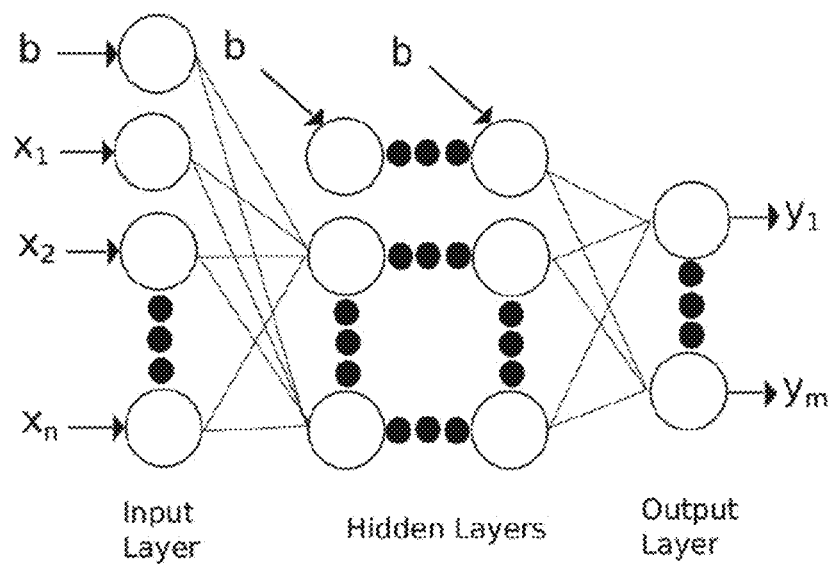

Neural network have multiple layers of connected neurons, which represent complex nonlinear relationships between inputs and outputs. An example structure of a neural network is displayed in FIG. 3D. The architecture of a fully connected neural network consists of an input layer, hidden layer and output layer. The number of neurons in each layer can be adjusted. Feed-forward neural networks are the simplest of its kind with information moving only in one direction. The movement starts from the input nodes, goes through the hidden layers and ends in the output nodes. By implementing multiple hidden layers the NNs are most common referred to as Deep Neural Networks (DNN). The example of FIG. 3D is a DNN.

The realization of such complex models is possible through strong computation power and a sufficient amount of data. Adjusting the parameters of the network influences the activation logic behind each neuron. While the network is being trained, the weights of each neuron are adjusted to meet a desired representation of the provided dataset. One training technique, called Gradient Descent (GD), works by finding a minimum of a cost function in an iterative manner. A learning rate is defined before and specifies the size each step will take to the minimum. This means that a large learning rate might end up causing a bouncing optimization while, on the other hand, a very small learning rate might take a long time to arrive at the desired representation. During learning, a change in the cost function is analyzed at each step. Once the cost function is not decreasing (or not decreasing substantially) and/or remains on the same level, it is determined that the problem has converged and the NN is trained.

Training Neural Networks can result in perfect representations of the provided training datasets which means bad accuracies for the test dataset. One possibility to prevent Neural Networks from overfitting is called dropout. This technique drops a defined number of neurons inside of the network. Dropout can be implemented at the last layer of the network or between every layer for example.

Another way of improving the network is to change activation functions. Each neuron can be influenced by different types of activation functions. One known example is the sigmoid function. The function's output is always between 0 and 1. The mathematical representation is the following:

$$f(t) = \frac{1}{1 + e^{-t}}$$

In other layers it might be more advantageous to gain only values which are between −1 and 1. This activation function can be realized by the hyperbolic function tanh. It is represented by the following formula:

$$\tanh(x) = \frac{2}{1 + e^{-2x}} - 1$$

Saturating functions can result in optimization problems, as the gradient equals 0 at large and small x values. Non-saturated activation functions turn out to solve an exploding or vanishing gradient and accelerate the convergence speed. The Rectified Linear Unit, short ReLU, is another activation function. Its output remains 0 for all negative values and does not change for positive values. The ReLU function is represented by the following mathematical formula:

$$f(x) = \max(0, x)$$

The early successes to solve new complex tasks cleared the way to develop new categories of Neural Networks.

Compared to early Neural Networks, models available in 2018 are far more advanced and can substitute more and more work done by humans.

When time-series data is to be input to a Neural Network (such as in some embodiments described herein), this may present complexities in Neural Networks. Training simple NNs on time series data would be inefficient, because the network would adjust its parameters on values given to particular time steps. Instead it is more efficient for the network to look for patterns in the structure of the data represented. Taking this into consideration, one specific type of Neural Network may be an advantageous option in some embodiments.

Convolutional Neural Networks (CNNs) are a subclass of Neural Networks. With the amount of collected data in some scenarios (e.g., for image recognition), a Neural Network can get very complex and hard to train. CNNs can produce very close accuracies and use less connections as well as parameters. This makes them very powerful and easier to train.

The main difference between a CNN and a standard NN is that the sum presented in the neural formula for the NN is substituted by a convolutional operation. These layers are called convolutional layers. Furthermore, CNNs often have layers that reduce the resolution of the data, referred to as pooling layers. The architecture of the network is separated into at least convolutional layers, pooling layers, and an output layer.

Convolutional layers determine which inputs are fed into each neuron, potentially with the help of filters applying filter parameters. These filters can be constructed using different sizes, defined by a kernel variable. The purpose of a filter is to evaluate data and multiply each filter parameter with a respective value in the input, which may be considered akin to element-by-element multiplication of matrices.

Figure 3E:
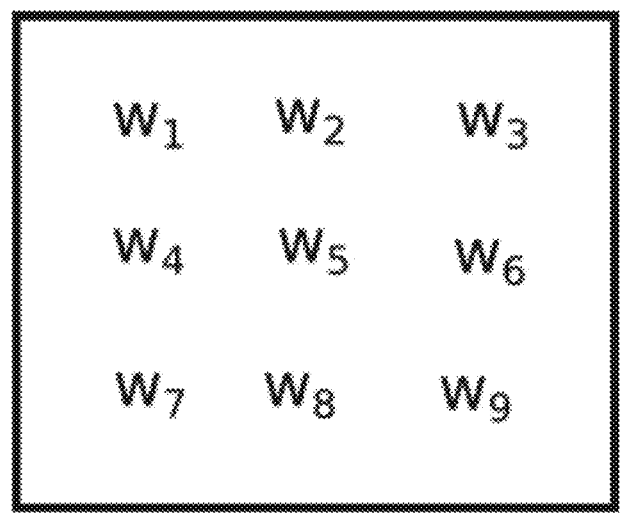

The filter will typically create exactly one output for each portion of input data. The manner in which the filter evaluates the input data can be defined by changing the "stride value." A stride of 1 would mean the filter moves one data value at a time. The result of all operations creates new data having a same data size as the input data. One example filter with the dimensions 3×3 is shown in FIG. 3E. The parameters inside the filters are randomly chosen before training the network.

Figure 3F:
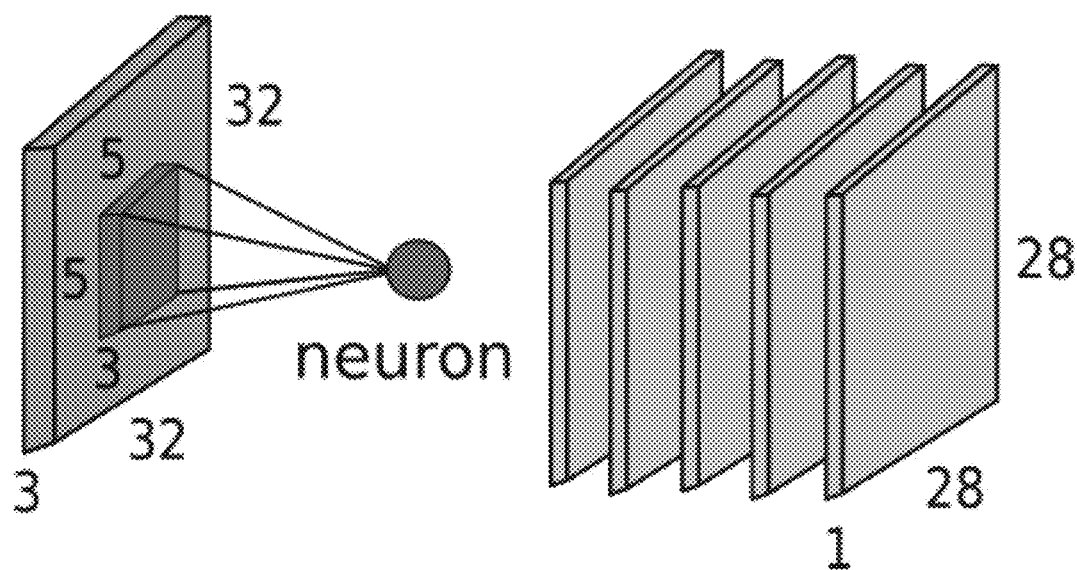

FIG. 3F represents an input data having dimensions of 32×32×3. The input data has data dimensions of 32×32×3. The filter is defined with dimensions of 5×5×3, and is displayed in FIG. 3F in the middle of the input data. The filter convolves over the image with defined steps, called strides, to process each grouping of input data with the filter. Since in this case the filter only moves one step at a time, the stride is equal to one. The output will be of size 28×28 times the number of filters used. In this example, 5 filters are used. Therefore, the output would be 28×28×5. In this first layer, each filter would include 76 parameters, resulting from the size 5*5*3 dimensions and one bias parameter. This adds up to a total of 380 parameters used across five filters. Training the network would mean changing the values of the 380 parameters in a way that the network could better differentiate the different labeled data.

The output of each neuron in CNNs may depend also on the type of activation function used. The activation function tanh, discussed above, is converges much more slowly during training, because of the saturating nonlinearity. ReLUs may show faster training. As a result, it may be advantageous to use ReLUs as the activation function in some or all layers, or in some embodiments in all layers except the last layer.

Figure 3G:
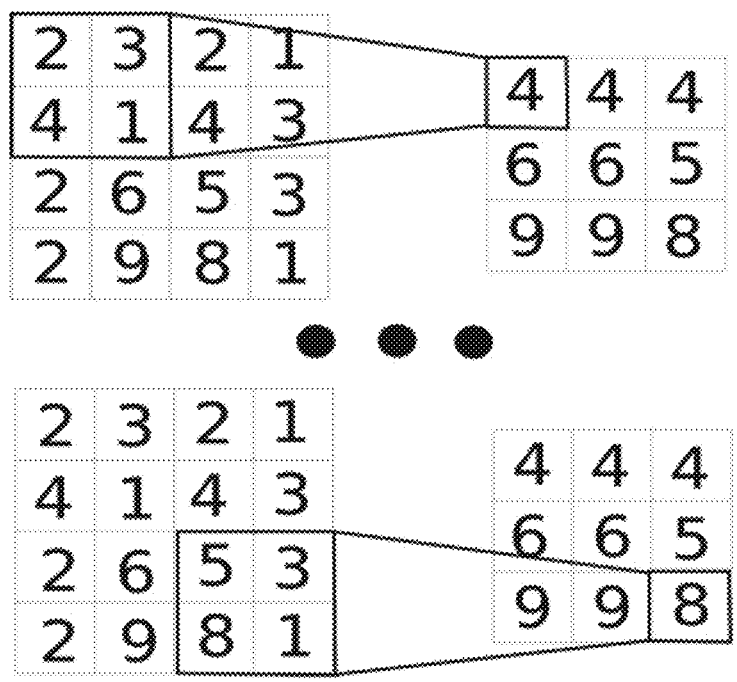

Convolutional layers are often followed by pooling layers, which decrease the resolution of the data. One example is shown in FIG. 3G, with pooling layer performing a reduction from 2×2 values to only one value, to reduce overall data from dimensions of 4×4 to dimensions of 3×3. This is done by choosing the maximum value of the 4 values identified by a pooler. Other pooling techniques take the average of all values for reduction. This pattern of convolutional layers and a followed pooling layer may be repeated several times in architectures of some embodiments.

The last layer, called output layer, will flatten the data and use each data value as an input for a fully-connected neural network layer, which is a common layer of a NN, as discussed above. A SoftMax activation function may be used to make sure that, for a classification problem, the different prediction likelihoods for different classes sum to 1. The mathematical representation of this method is represented by the following formula:

$$\sigma(z)_j = \frac{e^{z_j}}{\sum_{k=1}^{m} e^{z_k}}$$

Figure 3H:
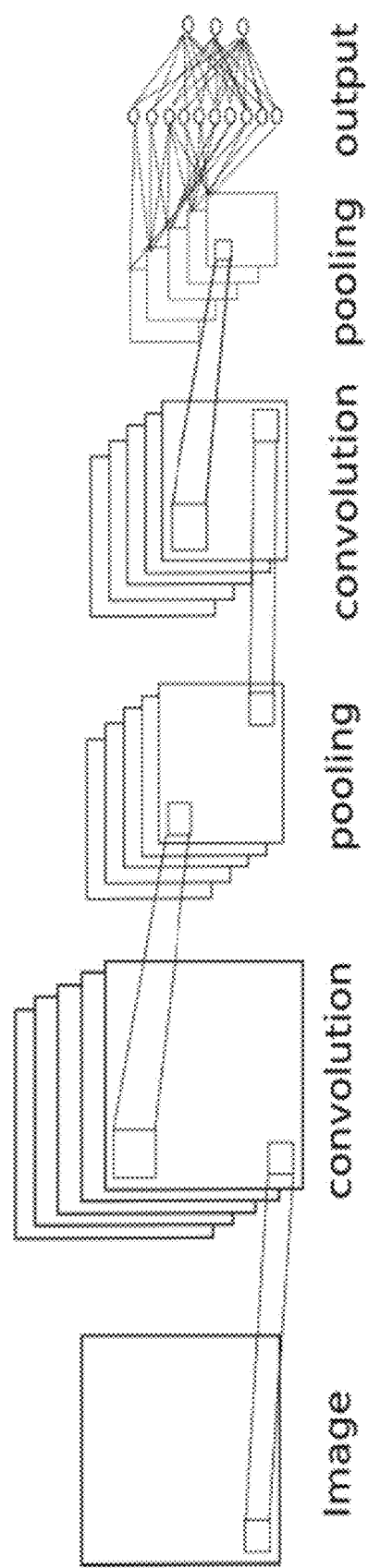

FIG. 3H shows an example of a CNN architecture with two convolutional layers and two pooling layers.

For training a CNN, one technique called mini-batch stochastic gradient descent may be used. The method can be described in 4 steps that are sequenced in each iteration:
 1) Take a sample of data, defined as batch
 2) Forward propagate the input through the network to receive the loss
 3) Use backpropagation to calculate the gradient
 4) Update the parameters by a defined learning rate using the gradient This procedure is repeated for all batches. Epochs that were also defined before set the amount of training the Neural Network may also be used to successively train the network on the input data, with an epoch being a complete pass of all the training data through the CNN. In particular, in each iteration of an epoch, a number of samples of training data equal to a batch size are processed. An epoch may include multiple iterations, to process all of the training data during the epoch. By training the neural network in multiple epochs, the training data may be input to the neural network multiple times.

In some embodiments operating in accordance with techniques described herein, a CNN may be trained (e.g., using Gradient Descent or another technique) to identify different classes of vehicle data, associated with whether a collision occurred and/or with different characteristics of collisions (e.g., severity, angle of impact, etc.). In some such embodiments, a batch size of 150 may be chosen, and the CNN may be trained over 200 epochs. The CNN of some embodiments may include an input layer followed by four sets of layers, where each set includes two convolutional layers followed by a pooling layer that reduces the data dimensions by two and a dropout of 25% to mitigate risk of overfitting, and a fully-connected output layer that flattens and combines all dimensions with a SoftMax function to ensure the likelihoods for the set of classes/predictions sum to 1.

CNNs are mostly used in image classification problems. Such networks are configured for use with data (e.g., image pixels) with defined positions. Transferring this thinking to a time series, the time series has also values that happen to a certain point in time. This can create a requirement, though, that the time series be uniformly sampled, to have fixed positions in time. In some embodiments, input data may include a time series with five dimensions (acceleration in x, y, z; magnitude of total acceleration; and speed) which each have values for every 10 ms over a time frame of 20 seconds. The CNN may be trained with this data to find patterns automatically, which can be used to classify other data.

When implementing the convolution, it is possible to convolve over the time series with a one-dimensional filter that will create another time series. In some embodiments, the filter may be chosen to have a kernel size of 5. This means that the filter will consider five steps, which is equal to 50 ms over the time series. Since the input data has five channels (the acceleration in x, y, z; the magnitude; and speed), the filter of this example will be of size 5×5. That means every filter contains 25 parameters, which may be initialized with a random number and change through the training process. One formula to calculate the number of parameters per layer may be the following:

total_params_per_layer=(filter_width*channels+1)
 *number_of_filters

The number one that is added inside of the bracket represents a bias that is included in every neuron.

Figure 3I:
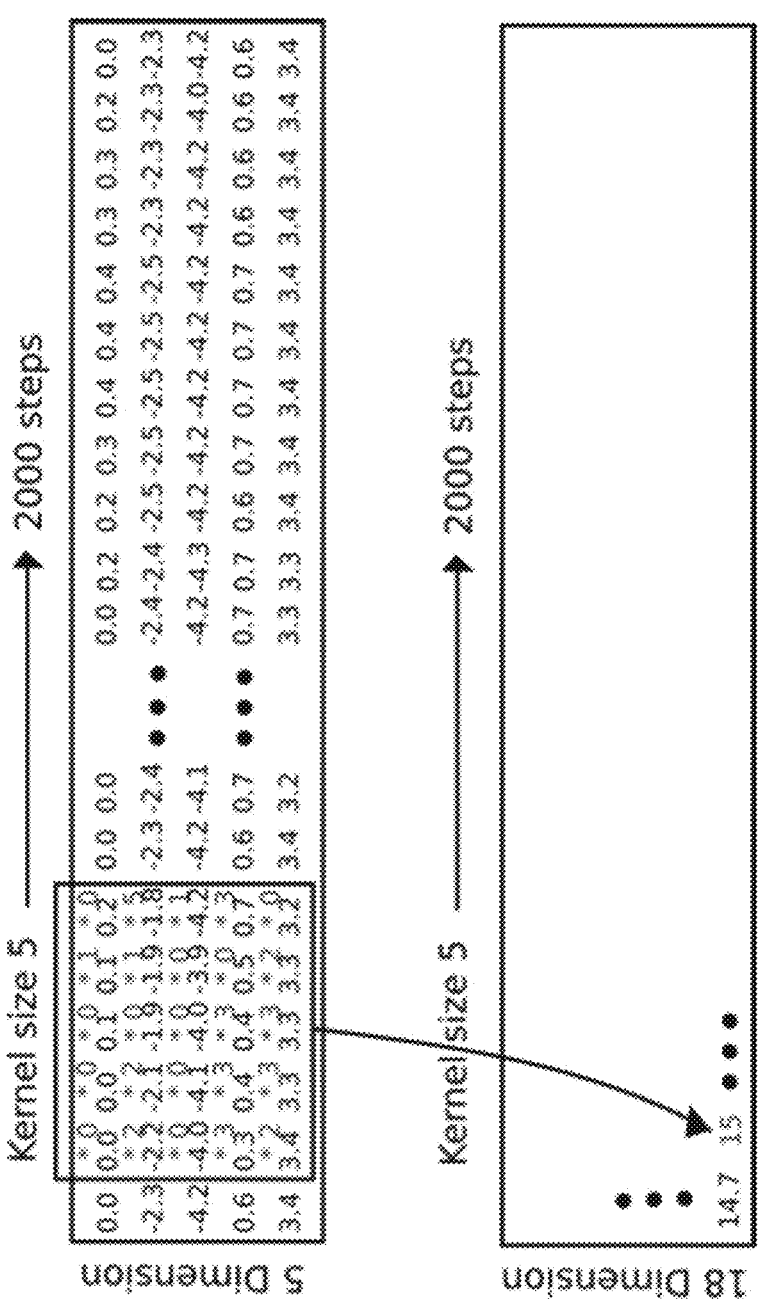

The process of convolving over the time series is described in FIG. 3I for the first convolutional layer. The filter that starts from the left with the size 5×5 is doing an elementwise multiplication and writes the result into the next time series below. With a padding defined as same, the size of the time series that is created will be equal to the original one. This is done by adding zeros to the end of the time series and convolving over these as well. By using 18 filters the resulting output will be a time series of 2,000 steps with 18 channels.

The number of filters chosen will determine the number of new channels for the input of the next layer. In some embodiments, 18 filters may be chosen for the first layer. This means the second convolutional layer will take a time series as input which consists of 18 dimensions. Using another kernel size of 5 will create a new filter which has dimensions 5×18. For this filter 90 parameters are trained for each filter.

As discussed above, in some embodiments the CNN architecture may include four parts, in which each has a one-dimensional convolutional layer followed by another one-dimensional convolutional layer without decreasing the step size and, after these two layers, a pooling layer that decreases the step size by two and addition of a dropout of 25% that prevents the network from overfitting. These four parts are connected in sequence and feed into a fully connected layer combines all dimensions and a SoftMax returns three predictions for the three defined classes.

Figure 4:
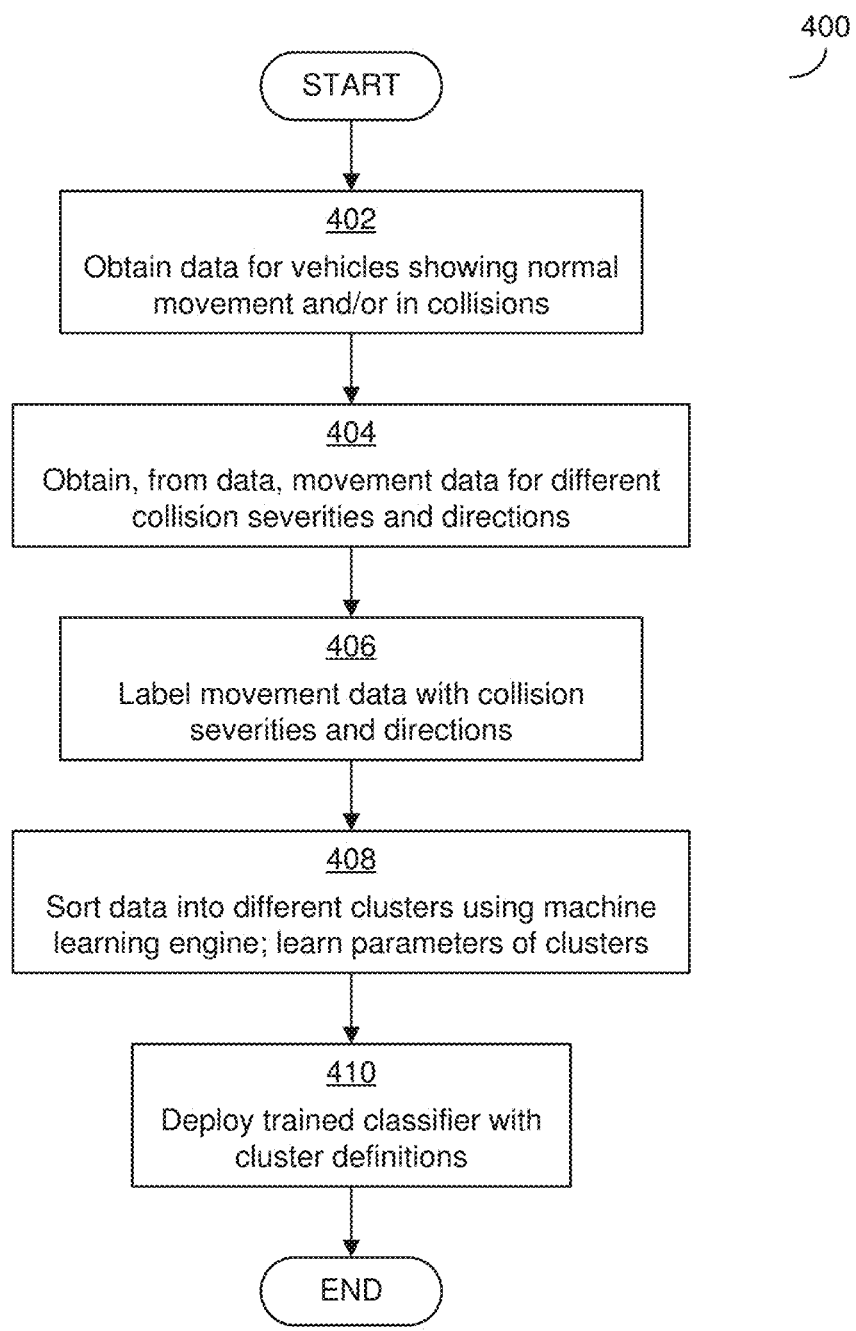
FIG. 4 is a flowchart of a process that may be implemented in some embodiments to train a classifier.

FIG. 4 illustrates one techniques that may be implemented in some embodiments to train a neural network (e.g., a CNN) to implement a classifier that may be used by a collision detection facility, in accordance with techniques described herein.

The process 400 of FIG. 4 may be performed during a configuration phase, in which a collision detection facility is configured prior to use such as in the process 200 of FIG. 2. The configuration may be performed by an administrator, such as a human administrator, setting up the collision detection system for the subsequent use.

The process 400 of FIG. 4 begins in block 402, in which data describing vehicles moving in normal movements and/or data describing vehicles engaged in collisions is obtained. Data describing normal movements may be used to train a classifier to recognize data that is associated with movements that are not collisions, to define one or more classes associated with normal driving or otherwise not-collisions. Data describing vehicles engaged in collisions may be used to train the classifier to recognize data that is associated with collisions or with different types of collisions, such as with collisions of different severities or collisions with different impact angles. The data that is obtained in block 402 may include acceleration data or other movements of movement data described above (magnitude of total acceleration, speed), or other data describing a vehicle (e.g., ECU or OBD data). The data that is obtained may be for a time period that matches the time period used by the collision detection facility (e.g., that was defined in block 204 of FIG. 2).

The data obtained in block 400 may not be labeled or curated data, and may not be arranged in a way that a classifier could be clearly trained on. For example, the data may be mixed together, with data for different scenarios not labeled or differentiated. To train the classifier, it may be helpful to at least differentiate and train the data, as there may be some advantages to supervised or semi-supervised training rather than relying solely on unsupervised learning.

Accordingly, in block 402, the data describing vehicles engaged in collisions may be separated out in block 404, such that data associated with different collision scenarios is separated. This process may be manual or automatic, depending on what data is available as a basis to for which to conduct a differentiating. Data associated with not-collisions may not be differentiated in some embodiments, resulting in one class being trained that has features for all different types of normal movements. In other embodiments, though, different classes of not-collisions may be defined to aid in more reliably identifying not-collisions.

Once the data is separated in block 404, in block 406 the different categories of collisions or other information may be labeled with whether they reflect a collision or characteristics of the type of collision they reflect (e.g., severity, angle of impact). In block 408, the labeled data may then be separated into clusters by a machine learning engine and features identified with each cluster identified by the machine learning engine, to define the clusters and define the classes. It is these features that will then be used to subsequently match data for a suspected collision to a class, by looking for a potential match between the data. To repeat an example from above, a straightforward rear-end collision may include movements that are primarily forward-backward movements, while a collision in which the vehicle is struck broadside by another vehicle may be associated with primarily right-left movement data. The trained classifier may, based on the labeled data from block 406, draw these same conclusions by observing that the rear-end collision is associated largely with forward-backward movement data while a broadside collision is largely associated with right-left data.

Based on these learned parameters of each of the clusters, a trained classifier is created that includes each of the classes defined from the clusters. The trained classifier may then be used by a collision detection facility, such as in the manner described above.

While not discussed above in connection with FIG. 4, it should be appreciated that it would be advantageous if, when movement data is obtained in block 402 that is for a time period, the data would include samples generated at the same time scale (e.g., same interval), and over the same period of time, as the data that will be collected by a collision detection facility for a suspected collision. Including the data for the same length of time period and for the same interval may ease classification of the data input for a suspected collision, as the input data will be temporally aligned with the training of the classifier. In some embodiments, the time period may be 20 seconds and the sampling rate for the movement data may be 10 ms, meaning there are 100 samples per second.

In some cases, the data that is obtained in block 402 to be used in training a system may not be aligned in this manner with the data that will be collected by a collision detection facility. For example, the data may be for a shorter or longer time period, or may include samples generated at a different interval. The movement data may therefore be prepared for training in some embodiments, by generating data for the same time period and at the same interval. If in the input data is for a longer time period, the data may be truncated to match the desired time period length. If the time period is shorter, additional data may be generated by interpolating the available data. As another example, if the input data includes samples at a different interval than the data will later be collected by a collision detection facility, such as a slower or faster sampling rate, the input data will be sampled and/or interpolated to generate data at the desired time intervals and for the desired time period. For example, data points in the input data that are adjacent to a time at which a data point is desired (for a time that aligns with the desired sampling rate) will be interpolated to generate the desired data point.

In some embodiments, Dynamic Time Warping (DTW) is used to process input time series data and prepare it for analysis using the trained classifier.

In some embodiments, the magnitudes of input data points may also be normalized based on the scale of input training data, to yield values that are on a similar scale.

In this manner, a classifier can be trained based on collision data to generate information on whether a collision has occurred and, if so, one or more characteristics of that collision.

FIGS. 5A-5E illustrate examples of data with which some embodiments may operate, as an example of how techniques described herein may be implemented in some embodiments.

Figure 5A:
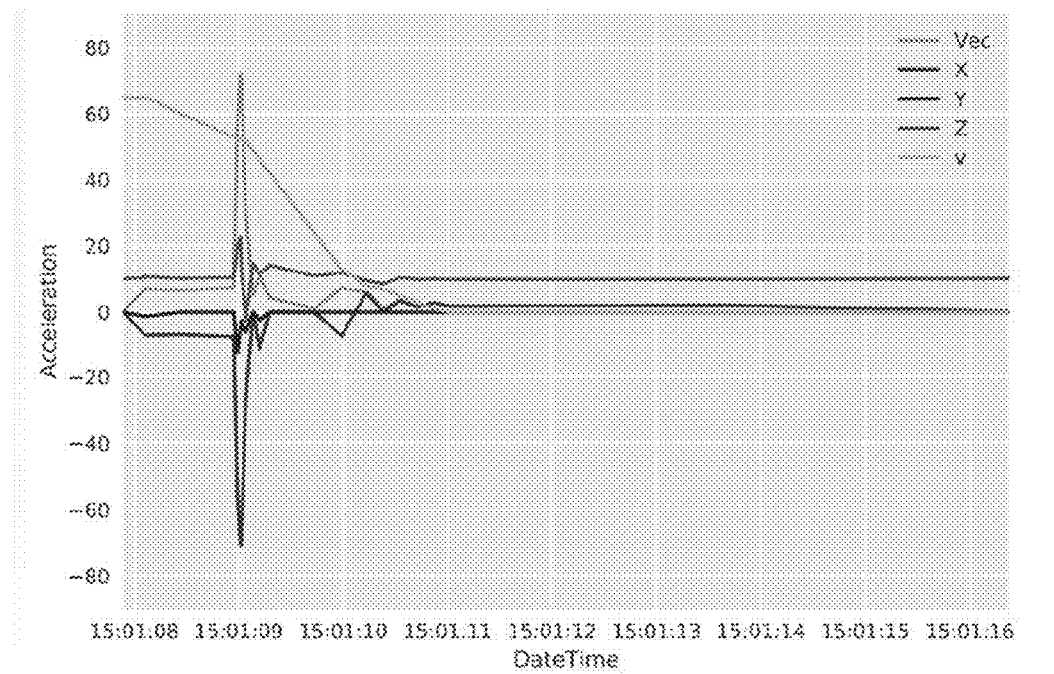
FIGS. 5A-5E show values associated with an illustrative implementation of some techniques described herein.
Figure 5B:
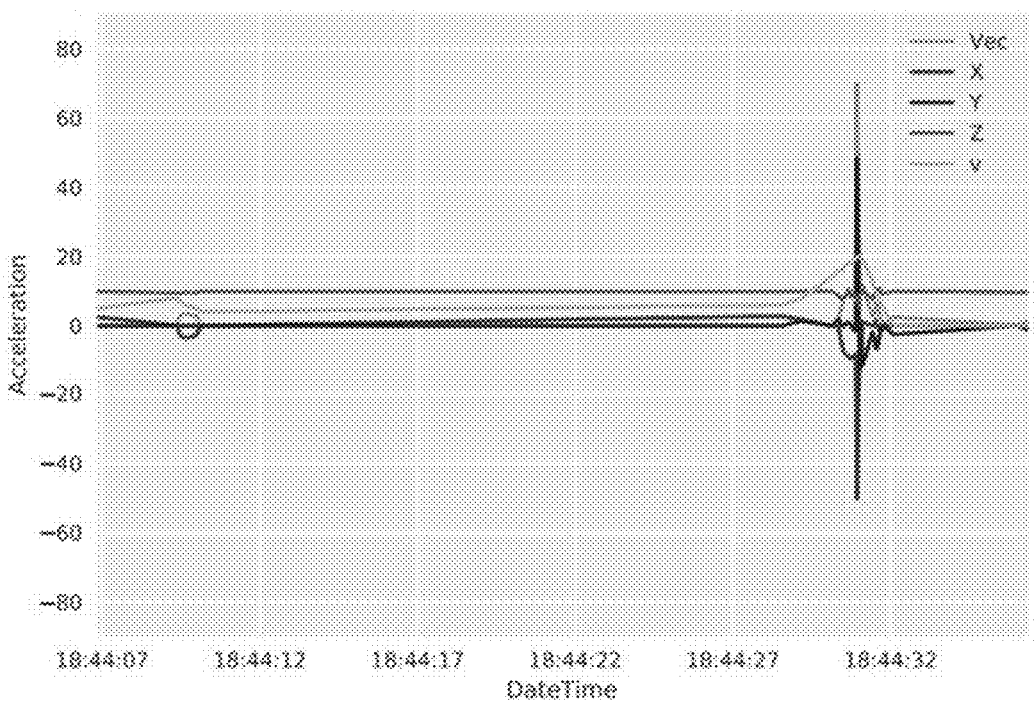
Figure 5C:
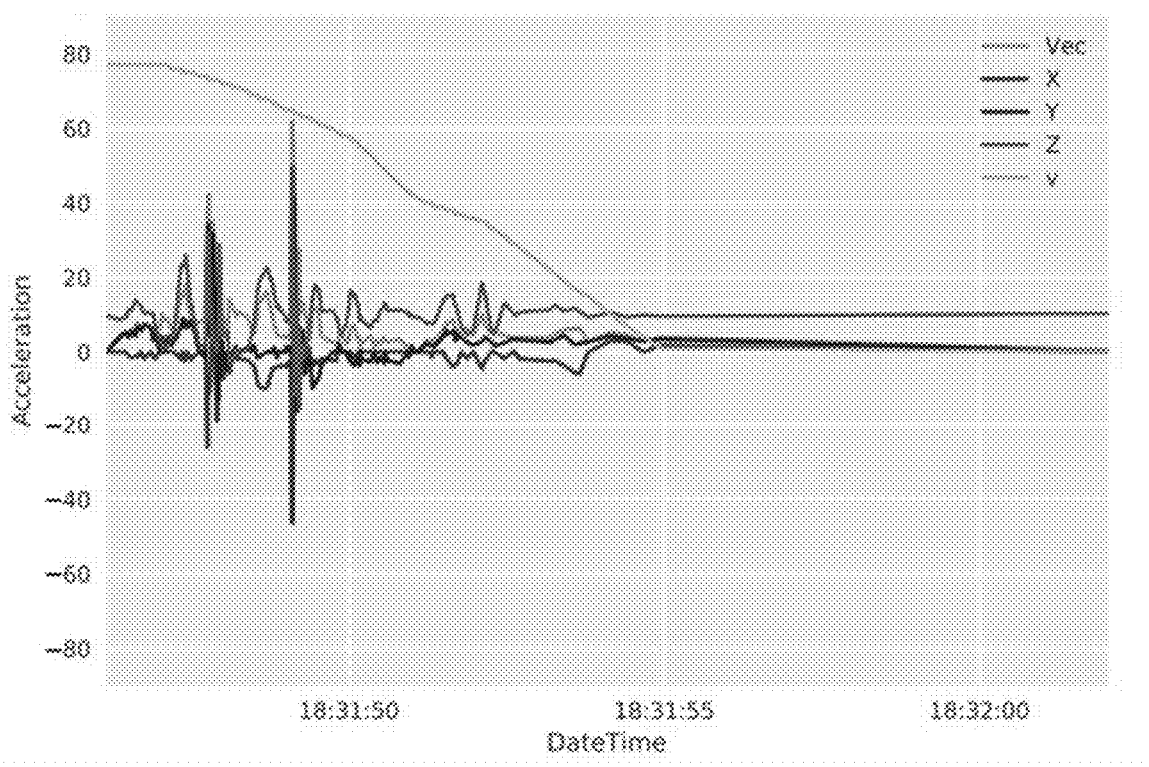

FIGS. 5A-5C illustrate examples of graphs of movement data that may be used to train a classifier or that may be compared to a trained classifier to determine whether a collision occurred and/or to characterize the collision. The example of FIG. 5A is associated with collisions in which a vehicle is rear-ended or hits an object (e.g., another vehicle, or an obstacle) straight on with its front end. These are forward-backward collisions. The graph of FIG. 5A includes lines for accelerations in x (forward-backward), y (right-left), and z (up-down) directions for the vehicle, as well as a magnitude of total acceleration at a time ("vec"), and a speed v. The x-axis of this graph is a time period for a collision, such as the time period discussed above in connection with block 204 of FIG. 2, with the time between each point representing the sampling interval. As can be seen from the graphs of the x, y, and z accelerations, the collision included little y (right-left) or z (up-down) acceleration and instead largely consists of negative acceleration (deceleration) in the x direction (forward-backward). This is because, in a typical forward-backward collision like a rear-ending, most of the acceleration change is in the forward-backward direction. The classifier may learn that pattern and subsequently identify situations in which the change in acceleration is largely in the x direction as forward-backward collisions like a rear-ending.

FIG. 5B illustrates an example of a graph in which a vehicle was struck from an angle, not forward-backward. The graph of FIG. 5B includes the same lines for the same variables as the graph of FIG. 5A. The graph of FIG. 5B demonstrates that in angled collisions, there is change in acceleration in both the x direction (forward-backward) and the y direction (right-left), though little change in the z direction (up-down).

FIG. 5C illustrates an example of a graph in which a vehicle, as part of a collision, left the road. The graph of FIG. 5C includes the same lines for the same variables as the graphs of FIGS. 5A and 5B. As can be seen in the graph of FIG. 5C, when the vehicle leaves the road, there may be substantial changes not only in the x and y directions, but also in the z direction (up-down). In each of these lines, there is substantial change over time, showing that the vehicle moved quite a bit as part of this accident.

Figure 5D:
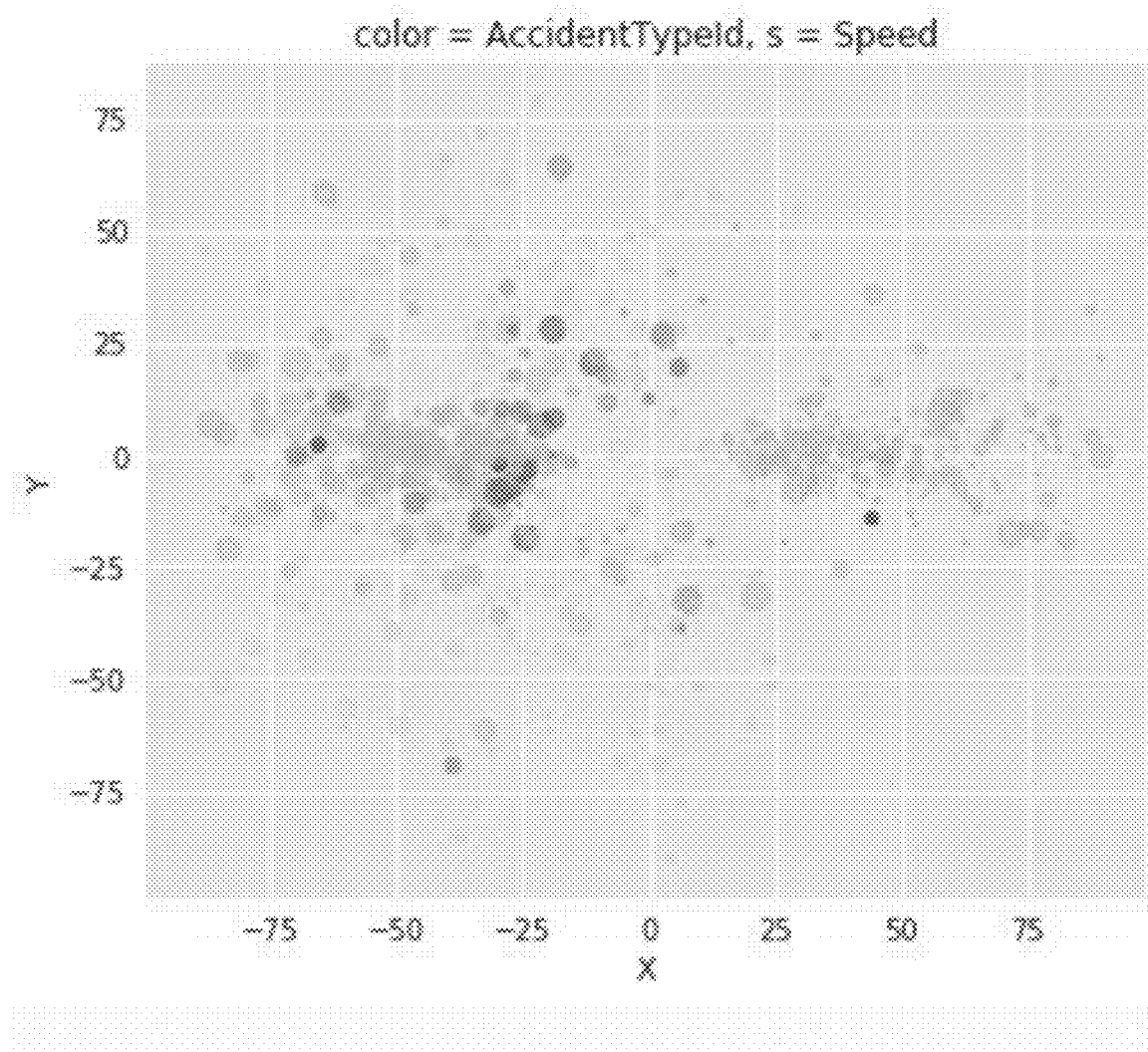

Data for different forms of collisions is illustrated in FIG. 5D, formatted as a scatterplot based on the x and y accelerations with color of the dot indicating accident type and size of the dot indicating speed. A collection of bright blue dots is spread throughout the middle of the graph, cluster in a band around the 0 value on the y-axis but spread throughout the x axis. These are dots associated with different forward-backward collisions, confirming again that a forward-backward collision has little change in the y direction (right-left). The green dots, however, show varying values for change in the y direction (right-left) and are all associated with negative change (deceleration) in the x direction (forward-backward). These are points associated with angled impacts, where there is substantial change in the right-left direction and the vehicle slows down substantially in the forward-backward direction.

Figure 5E:
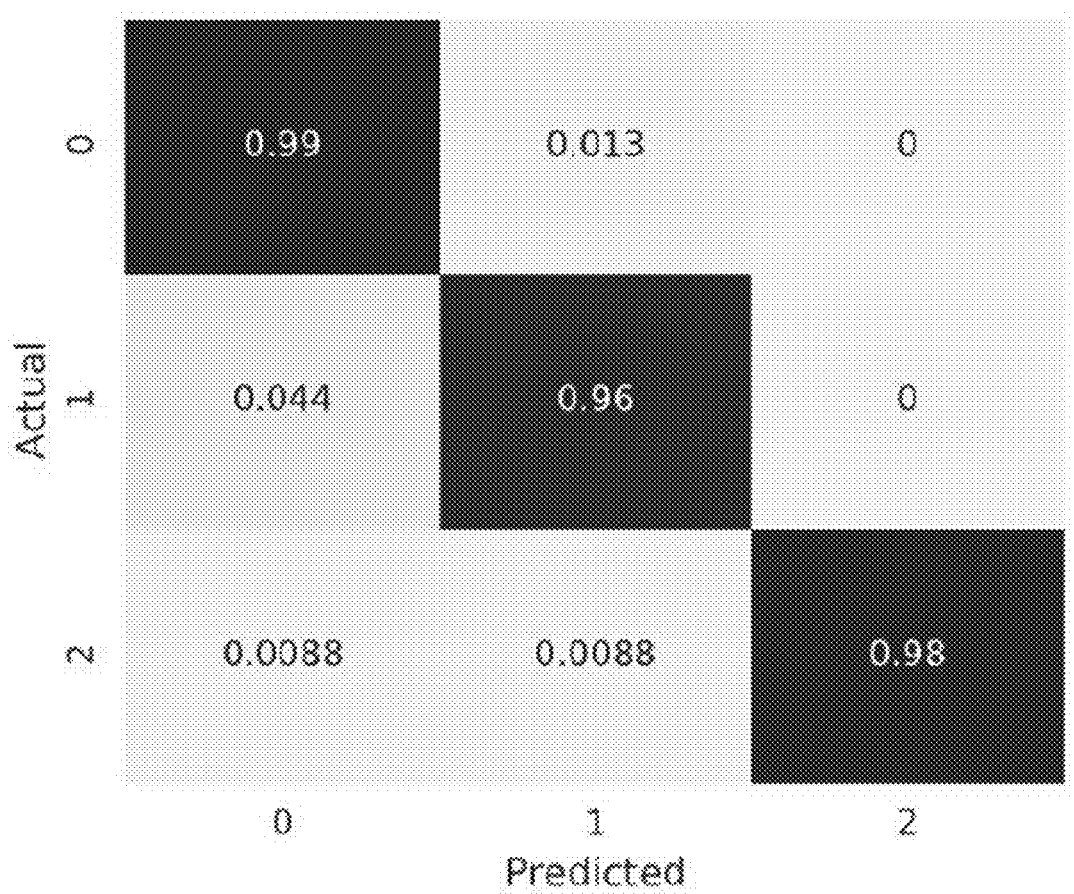

As discussed above, attempting to detect or characterize a collision using only acceleration data from a single point during an accident is unreliable. Using techniques described herein, which obtain longitudinal movement information for a time period surrounding an event associated with a suspected collision, or other information obtained for a vehicle for that time period, may be highly reliable. FIG. 5E shows a chart demonstrating this high reliability, with low false positions or false negatives. In the chart, a "1" category is not a collision, a "2" category is a forward-backward collision, and a "3" category is an angled impact collision. The graph shows the predictions generated by a system trained using the data of FIG. 5D, compared with the actual scenario. As shown by the chart, the trained classifier will accurate determine, in 98.7% of cases, that no collision occurred when there was, in reality, no collision. The classifier never identifies data related to a not-collision as reflecting an angled-impact collision, and only 1.3% of the time, incorrectly identifies the not-collision as being a forward-backward collision. Similarly, the trained classifier properly identifies, in 95.6% of cases, that a forward-backward collision is a forward-backward collision, with the remaining cases limited to misidentifying the scenario as a not-collision. Lastly, the trained classifier correctly concludes, in 98.2% of cases, that an angled-impact collision is an angled-impact collision, with the misidentifications evenly spread, in less than 1% of cases, between not-collisions and forward-backward collisions.

Accordingly, the trained system is highly reliable in determining whether a collision occurred and, if so, in characterizing an angle of impact of the collision. The collision detection facility of some embodiments described herein can therefore be reliably used to determine whether a collision has occurred and, if so, characteristics of the collision, to determine an appropriate response to the collision.

Techniques operating according to the principles described herein may be implemented in any suitable manner. Included in the discussion above are a series of flow charts showing the steps and acts of various processes that determine whether a collision occurred and/or, if so, to characterize a collision. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 606 of FIG. 6 described below (i.e., as a portion of a computing device 600) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 6:
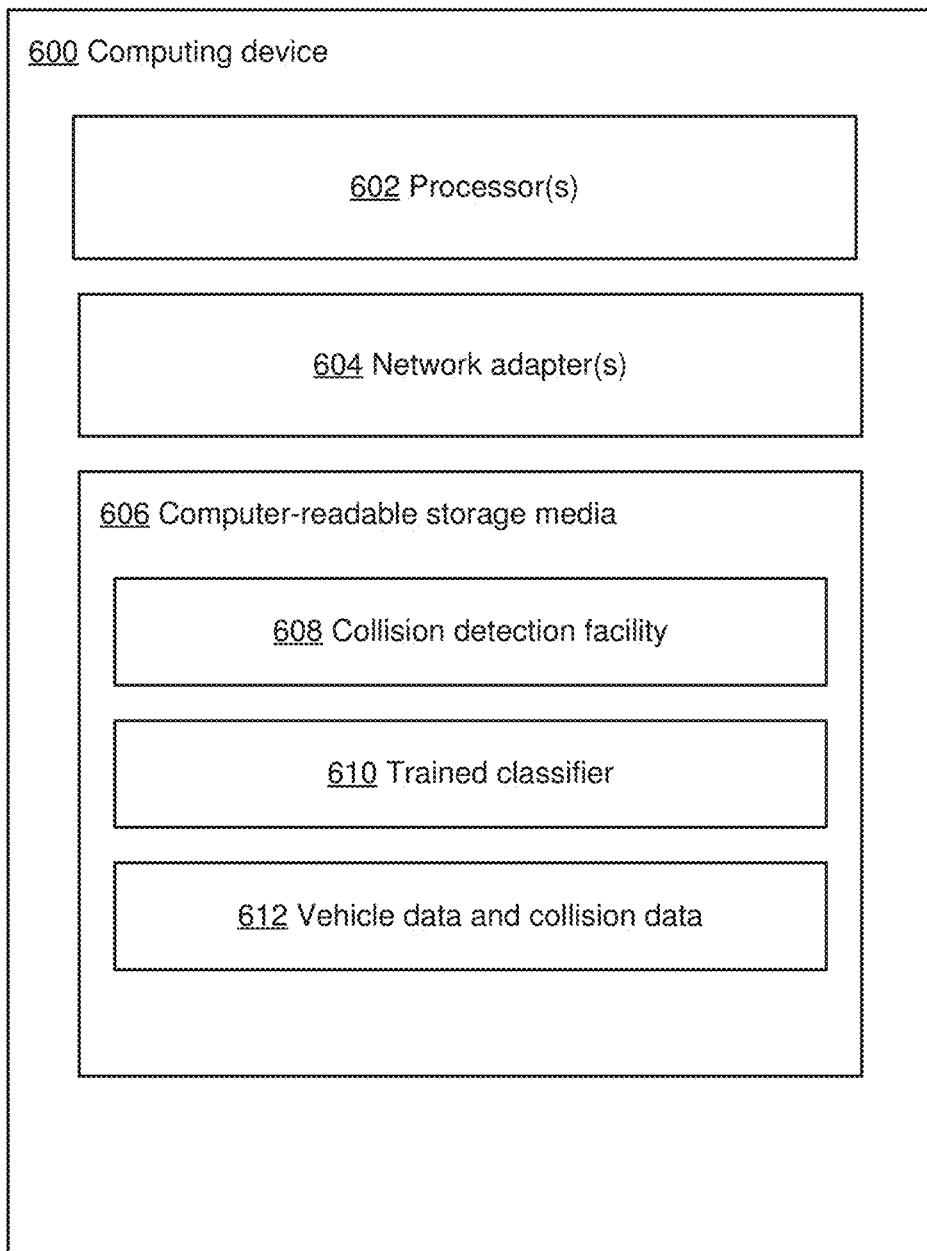
FIG. 6 is a block diagram of a computer system with which some embodiments may operate.

FIG. 6 illustrates one exemplary implementation of a computing device in the form of a computing device 600 that may be used in a system implementing techniques described herein, although others are possible. It should be appreciated that FIG. 6 is intended neither to be a depiction of necessary components for a computing device to operate a collision detection facility in accordance with the principles described herein, nor a comprehensive depiction.

Computing device 600 may comprise at least one processor 602, a network adapter 604, and computer-readable storage media 606. Computing device 600 may be, for example, a desktop or laptop personal computer, a personal digital assistant (PDA), a smart mobile phone, a server, or any other suitable computing device. Network adapter 604 may be any suitable hardware and/or software to enable the computing device 600 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 606 may be adapted to store data to be processed and/or instructions to be executed by processor 602. Processor 602 enables processing of data and execution of instructions. The data and instructions may be stored on the computer-readable storage media 606.

The data and instructions stored on computer-readable storage media 606 may comprise computer-executable instructions implementing techniques which operate according to the principles described herein. In the example of FIG. 6, computer-readable storage media 606 stores computer-executable instructions implementing various facilities and storing various information as described above. Computer-readable storage media 606 may store a collision detection facility 608, a trained classifier 610 for the facility 608 (including definitions of classes for the classifier), and data 612 that includes vehicle data and collision data, which may be collected for a suspect collision and analyzed by the collision detection facility 608 and/or used to train the classifier 610 for subsequent use in analyzing data regarding a suspect collision.

While not illustrated in FIG. 6, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
    detecting an acceleration event from an accelerometer included in a monitoring device that is installable in a vehicle, the acceleration event being indicative of a potential collision between the vehicle and an object;
    setting a time period from before and after the detected acceleration event;
    collecting additional data, other than the acceleration event, obtained through the monitoring device during the time period;
    sending at least the additional data to a remote site having servers operated by a vendor of the monitoring device and that is remote from the vehicle for subsequent analysis; and,
    providing, from the remote site, the at least the additional data to an operator of a fleet of vehicles of which the vehicle is a member.

2. The method of claim 1, wherein setting a time period from before and after the detected acceleration event comprises setting a time period from before and after the detected acceleration event in response to the detected acceleration event.

3. The method of claim 1, further comprising communicating, via Bluetooth®, at least the additional data from the monitoring device to another device for sending to the remote site.

4. The method of claim 1, further comprising determining whether the potential collision is likely to have been a collision based on the detected acceleration event and the additional data.

5. The method of claim 1, further comprising contacting a driver of the vehicle.

6. The method of claim 1, wherein setting a time period from before and after the detected acceleration event comprises setting a time period between 3 and 10 seconds.

7. A method comprising:
 detecting an acceleration event from an accelerometer included in a monitoring device that is installable in a vehicle, the acceleration event being indicative of a potential collision between the vehicle and an object;
 setting a time period from before and after the detected acceleration event;
 collecting additional data, other than the acceleration event, obtained through the monitoring device during the time period; and
 sending at least the additional data to a remote site that is remote from the vehicle for subsequent analysis.

8. The method of claim 7, wherein setting a time period from before and after the detected acceleration event comprises setting a time period from before and after the detected acceleration event in response to the detected acceleration event.

9. The method of claim 7, further comprising providing, from the remote site, at least the additional data to an operator of a fleet of vehicles of which the vehicle is a member.

10. The method of claim 7, wherein sending at least the additional data to a remote site comprises sending the at least the additional data to servers operated by a vendor of the monitoring device.

11. The method of claim 7, further comprising communicating, via Bluetooth®, at least the additional data from the monitoring device to another device for sending to the remote site.

12. The method of claim 11, further comprising providing, from the remote site, at least the additional data to an operator of a fleet of vehicles of which the vehicle is a member.

13. The method of claim 7, further comprising notifying, from the remote site, an operator of a fleet of vehicles of which the vehicle is a member that a collision is likely to have occurred.

14. The method of claim 7, further comprising determining whether the vehicle has experienced an actual collision.

15. The method of claim 7, further comprising determining whether the potential collision is likely to have been a collision based at least in part on the additional data.

16. The method of claim 15, further comprising determining whether the potential collision is likely to have been a collision based at least in part on the detected acceleration event.

17. The method of claim 7, further comprising contacting a driver of the vehicle.

18. The method of claim 17, further wherein contacting the driver of the vehicle comprises automatically contacting the driver of the vehicle.

19. The method of claim 7, further comprising contacting emergency services and/or roadside assistance services in an area in which the vehicle is located to request dispatch of emergency services or roadside assistance to the vehicle using location information and/or identifying information of the vehicle.

20. The method of claim 7, wherein collecting additional data comprises collecting a speed of the vehicle.

21. The method of claim 7, wherein collecting additional data comprises data indicative of movement of the vehicle.

22. The method of claim 7, wherein collecting additional data comprises collecting data regarding one or more components of the vehicle.

23. The method of claim 22, wherein collecting data regarding one or more components of the vehicle comprises collecting data from an airbag sensor.

24. The method of claim 7, wherein setting a time period from before and after the detected acceleration event comprises setting a time period between 3 and 10 seconds.

25. The method of claim 7, further comprising classifying, using at least one trained classifier, the acceleration event and the additional data into at least one of a plurality of classes, each class of the plurality of classes being associated with whether a collision occurred, and determining whether the potential collision is likely to have been an actual collision based at least in part on the at least one class identified in the classifying.

26. The method of claim 25, wherein each class of the plurality of classes that is associated with occurrence of a collision is further associated with at least one collision characteristic; and wherein the method further comprises, in response to determining that the potential collision is likely to have been a collision, characterizing the collision based at least in part on the at least one collision characteristic associated with one or more of the at least one class identified in the classifying.

27. The method of claim 22, wherein collecting the data regarding the one or more components of the vehicle comprises obtaining information via an On-Board Diagnostics (OBD) system of the vehicle.

28. At least one non-transitory computer-readable storage medium having encoded thereon executable instructions that, when executed by at least one processor, cause the at least one processor to carry out a method comprising:
 detecting an acceleration event from an accelerometer included in a monitoring device that is installable in a vehicle, the acceleration event being indicative of a potential collision between the vehicle and an object;
 setting a time period from before and after the detected acceleration event;
 collecting additional data, other than the acceleration event, obtained through the monitoring device during the time period; and
 sending at least the additional data to a remote site that is remote from the vehicle for subsequent analysis.

29. An apparatus comprising:
 a monitoring device that is installable in a vehicle, the monitoring device having at least one processor, an accelerometer coupled to the at least one processor, and at least one storage medium communicating with the processor and having encoded thereon executable instructions that, when executed by the at least one processor, cause the at least one processor to carry out a method comprising:
  detecting an acceleration event from the accelerometer, the acceleration event being indicative of a potential collision between the vehicle and an object;

setting a time period from before and after the detected acceleration event;

collecting additional data, other than the acceleration event, obtained through the monitoring device during the time period; and sending at least the additional data to a remote site that is remote from the vehicle for subsequent analysis.

* * * * *